(12) United States Patent
Reimers et al.

(10) Patent No.: US 9,077,459 B2
(45) Date of Patent: Jul. 7, 2015

(54) DEVICES AND METHODS FOR DYNAMIC BROADCAST

(75) Inventors: Ulrich Reimers, Vechelde (DE); Peter Neumann, Puetzlingen (DE); Junge Qi, Braunschweig (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/428,743

(22) Filed: Mar. 23, 2012

(65) Prior Publication Data

US 2013/0254828 A1 Sep. 26, 2013

(51) Int. Cl.
| | |
|---|---|
| H04N 7/173 | (2011.01) |
| H04H 20/26 | (2008.01) |
| H04N 21/2385 | (2011.01) |
| H04N 21/258 | (2011.01) |
| H04N 21/262 | (2011.01) |
| H04N 21/433 | (2011.01) |
| H04N 21/442 | (2011.01) |
| H04N 21/61 | (2011.01) |
| H04H 20/42 | (2008.01) |
| H04H 20/40 | (2008.01) |
| H04H 60/76 | (2008.01) |

(52) U.S. Cl.
CPC .......... *H04H 20/26* (2013.01); *H04N 21/2385* (2013.01); *H04N 21/25891* (2013.01); *H04N 21/26216* (2013.01); *H04N 21/4331* (2013.01); *H04N 21/44209* (2013.01); *H04N 21/6112* (2013.01); *H04N 21/6118* (2013.01); *H04N 21/6125* (2013.01); *H04N 21/6131* (2013.01); *H04N 21/6143* (2013.01); *H04H 20/40* (2013.01); *H04H 20/42* (2013.01); *H04H 60/76* (2013.01); *H04H 2201/40* (2013.01)

(58) Field of Classification Search
USPC .......... 725/91, 100, 103, 110, 112, 114, 131, 725/134, 138–139, 151
See application file for complete search history.

(56) References Cited

U.S. PATENT DOCUMENTS

| | | | |
|---|---|---|---|
| 6,618,585 B1 * | 9/2003 | Robinson | 455/3.02 |
| 7,907,889 B2 * | 3/2011 | Fujita et al. | 455/3.02 |
| 8,370,201 B2 * | 2/2013 | Cansler et al. | 705/14.4 |
| 2003/0051251 A1 * | 3/2003 | Sugimoto et al. | 725/95 |
| 2003/0093476 A1 * | 5/2003 | Syed | 709/204 |
| 2009/0131101 A1 * | 5/2009 | Van Rooyen | 455/552.1 |

(Continued)

OTHER PUBLICATIONS

Mitchell Lazarus, "The Great Spectrum Famine", IEEE Spectrum, vol. 47, No. 10, Oct. 2010, pp. 26-31.

(Continued)

*Primary Examiner* — Mulugeta Mengesha
(74) *Attorney, Agent, or Firm* — Oblon, McClelland, Maier & Neustadt, L.L.P.

(57) ABSTRACT

A dynamic broadcast system as well as a terminal and a control device for use in such a dynamic broadcast system are presented. Transmission parameters, transmission times and transmission paths used for broadcasting and providing content, either via a broadcast network or a broadband network to terminals used in the dynamic broadcast system are dynamically controlled. Further, a decision logic is provided that dynamically decides transmission parameters, transmission times and transmission paths used for broadcasting and providing content based on monitoring data carrying information on user specific content usage and/or transmission quality data carrying information on the quality of a transmission link between a broadband server and a terminal and/or of a reception of content broadcast by a broadcast transmitter.

11 Claims, 10 Drawing Sheets

(56) References Cited

U.S. PATENT DOCUMENTS

| | | | |
|---|---|---|---|
| 2010/0296499 A1* | 11/2010 | Karaoguz et al. | 370/338 |
| 2011/0197224 A1* | 8/2011 | Meijer | 725/34 |
| 2012/0042349 A1* | 2/2012 | Ng et al. | 725/109 |
| 2012/0131623 A1* | 5/2012 | McDysan et al. | 725/97 |
| 2012/0189010 A1* | 7/2012 | Lee et al. | 370/392 |

OTHER PUBLICATIONS

Verus Pronk, et al., "Personal Television Channels: Simply Zapping through Your PVR Content", Philips Research Technical Note PR-TN-2009/00233, Jun. 2009, 15 pages.
Meeyoung Cha, et al., "Watching Television Over an IP Network", IMC '08: Proceedings of the 8$^{th}$ ACM SIGCOMM Conference on Internet Measurement, 2008, pp. 71-84.
P. Kreuger, et al., "Scheduling IPTV Content Pre-distribution", Lecture Notes in Computer Science; IP Operation and Management, vol. 5843, 2009, pp. 1-14.
ETSI EN 301 192, "Digital Video Broadcasting (DVB); DVB specification for data broadcasting", V1. 4.2., Apr. 2008, 79 pages.
George Koutitas, "Green Network Planning of Single Frequency Networks", IEEE Trans. on Broadcasting, vol. 56, No. 4, Dec. 2010, pp. 541-550.
Robert J. Achatz, et al., "Man-Made Noise Power Measurements at VHF and UHF Frequencies", NTIA Report 02-390, Dec. 2001, 39 pages.
ETSI TS 102 822-3-1, "Broadcast and On-line Services: Search, select, and rightful use of content on personal storage systems ("TV-Anytime"); Part 3: Metadata; Sub-part 1: Phase 1—Metadata Schemes", V1.6.1, Jul. 2010, 190 pages.
Klaus Merkel, "HbbTV—a hybrid broadcast-broadband system for the living room", EBU Technical Review 2010 Q1, Feb. 2010, pp. 1-10.
K. Matsumura, et al., "Hybridcast™ System and Technology Overview", Broadcast Technology, No. 43, 2011, pp. 6-11.
Digital Video Broadcasting (DVB), "GEM Media Synchronization API", DVB BlueBook A153, Oct. 2010, pp. 1-35.
U. Reimers, "DVB—The Family of International Standards for Digital Video Broadcasting", 2$^{nd}$ Ed., 2005, 9 pages.
W. Fischer, "Digitale Fernsehtechnik in Theorie und Praxis", Springer, 2006, 13 pages.
ETSI, "Broadcast and on-line Services: Search, select, and rightful use of content on personal storage systems ('TV-Anytime'); Part 2: Phase 1—System description", ETSI TS 102 822-2, V1.4.1, Nov. 2007, 127 pages.
O. Hoffmann, "Multimedia-Heimnetzwerk der Zukunft," FKT, Fachzeitschrift für Fernsehen, Film und elektronische Medien, vol. 2010, No. 1-2, Jan. 2010, pp. 51-59.
C. Zubayr, et al., "Tendenzen im Zuschauerverhalten," Media Perspektiven, vol. 2011, No. 3, Mar. 2011, pp. 126-138.
Chris Newell, "TV-Anytime support for personalized recommendations", BBC Research White Paper WHP 192, Feb. 2011, pp. 1-4.
Robert Kooij, et al., "Perceived Quality of Channel Zapping", Proceedings of the Fifth IASTED International Conference on Communication Systems and Networks, 2006, pp. 155-158.
B. Preim, "Entwicklung interaktiver Systeme", Springer, 1999, 14 pages.
International Standard, "Information technology—Generic coding of moving pictures and associated audio information: Systems", ISO/IEC 13818-1, Second Ed., Dec. 2000, 174 pages.
S. Jung, et al., "Design and Implementation of an Enhanced Personal Video Recorder for DTV", IEEE Transactions on Consumer Electronics, vol. 47, No. 4, Nov. 2001, pp. 915-920.
ETSI, "Hybrid Broadcast Broadband TV", ETSI TS 102 796, V1.1.1 Jun. 2010, 75 pages.
Junge Qi, et al., "Joint Optimization of Network Planning and Content Delivery Scheduling in Dynamic Broadcast", 61$^{st}$ Annual IEEE Broadcast Symposium, Oct. 2011, 6 pages.
J. Korst, et al., "Scheduling TV Recordings for a Recommender-Based DVR", 2010 IEEE 14$^{th}$ International Symposium on Consumer Electronics (ISCE), Jul. 2010, pp. 1-6.
ETSI, "Digital Video Broadcasting (DVB); Framing structure, Channel coding and modulation for digital terrestrial television", ETSI EN 300 744, V1.6.1, Jan. 2009, 66 pages.
ETSI, "Digital Video Broadcasting (DVB); Specification for the use of Video and Audio Coding in Broadcasting Applications based on the MPEG-2 Transport Stream", ETSI TS 101 154, V1.9.1, Sep. 2009, 163 pages.
Herve Benoit, "Digital Television MPEG-1, MPEG-2 and principles of the DVB system", 2$^{nd}$ ed., Herve Benoit, 2002, 4 pages.
ETSI, "Digital Video Broadcasting (DVB); Implementation guidelines for DVB terrestrial services; Transmission aspects", ETSI TR 101 190, V1.3.2, May 2011, 87 pages.
U. Reimers, "Dynamic Broadcast—the future of broadcast?", tech-i, No. 8, Jun. 2011, 16 pages.
Junge Qi, et al., "Dynamic Broadcast", Proceedings of 14$^{th}$ ITG Conference on Electronic Media, Mar. 2011, 6 pages.
P. Neumann, et al., "Seamless Delivery Network Switching in Dynamic Broadcast—Terminal Aspects", Proceedings of IEEE International Symposium on Broadband Multimedia Systems and Broadcasting, Jun. 2011, pp. 1-7.
P. Neumann, et al., "Live and Time-Shifted Content Delivery for Dynamic Broadcast: Terminal Aspects", IEEE International Conference on Consumer Electronics, Jan. 15, 2012, 2 pages.
U. Reimers, "Dynamic Broadcasting—The Future of Broadcast?", 14$^{th}$ ITG Conference on Electronic Media Technology, Oral Presentation (using powerpoint slides), Mar. 23, 2011, 28 pages.
Ulrich Reimers, "Dynamic Broadcasting—en Route to Convergence of Broadcast and Mobile", 15$^{th}$ International Conference ICIN, Oral Presentation (using powerpoint slides), Oct. 7, 2011, 16 pages.
Ulrich Reimers, "The Future of Terrestrial Broadcast: Dynamic and Hybrid", Future of Broadcast Television Summit 2011, Oral Presentation (using powerpoint slides), Nov. 10, 2011, 10 pages.
Ulrich Reimers, "The Future of Terrestrial Broadcast: Dynamic and Hybrid", BMSB 2011, Oral Presentation (using powerpoint slides), Jun. 10, 2011, 14 pages.
Ulrich Reimers, et al., "Mitteilungen aus dem Institut für Nachrichtentechnik der Technischen Universität Braunschweig", Band 21, Dec. 2011, Shaker Verlag Aachen, pp. 54-59.
Ulrich Reimers, "Technology Trends and the Future of Broadband Multimedia", IEEE Broadband Multimedia Systems and Broadcasting Conference, Oral Presentation (using powerpoint slides) Mar. 26, 2010, 3 pages.
Ulrich Reimers, "The Future of Digital Broadcasting", 14$^{th}$ IEEE International Symposium on Consumer Electronics (ISCE). Oral Presentation (using powerpoint slides), Jun. 10, 2010, 26 pages.
Ulrich Reimers, "The Future of Digital Broadcasting", European Commission, Electronic Communications Policy, Jan. 12, 2010, 17 pages.
Ulrich Reimers, et al., "Mitteilungen aus dem Institut für Nachrichtentechnik der Technischen Universität Braunschweig", Band 17, Dec. 2010, Shaker Verlag Aachen, pp. 57-60.

* cited by examiner

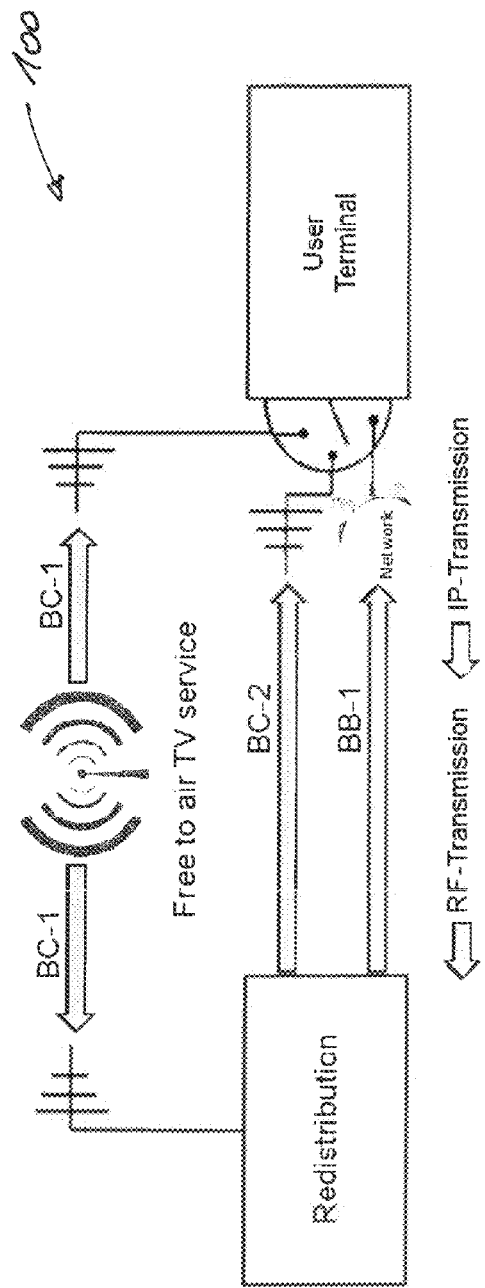

DEVICES AND METHODS FOR DYNAMIC BROADCAST

FIELD OF THE DISCLOSURE

The present disclosure relates to dynamic broadcast. In particular, the present disclosure relates to a terminal and a corresponding receiving method, a dynamic broadcast system and method, a controller device, a control method and a computer readable non-transitory medium.

DESCRIPTION OF RELATED ART

The scarce terrestrial frequency spectrum is an important factor for the development of wireless communication. Nowadays broadcast services take up a significant part of the frequencies in the (e.g. UHF or VHF) broadcast bands, which are ideal for in-house reception. Thanks to digitization, the spectrum usage efficiency of broadcast services has been increased largely compared to the times of analog. However, the network operation remains still static, i.e. the transmission parameters are fixed and invariable, transmitter power is constant, and services are delivered in pre-determined channels. Such traditional broadcast network has very low requirements on the receivers. Neither a feedback channel nor a content storage device is necessitated, and a channel scan process is usually only needed when the terminal device is powered on for the first time, since the transmission parameters for each TV channel will be stored for later tune-in.

Consumer electronics industry develops rapidly, and user terminals are becoming more and more powerful. Recently, a trend in the field of consumer TV is the development of "hybrid user terminals"" which can acquire media content via broadband networks, such as xDSL, DOCSIS or satellite communication links and, eventually, even via wireless Internet networks (e.g. via a Long Term Evolution (LTE) network) or other wireless data networks in addition to traditional broadcast networks. Although such receivers allow the seamless access to both Internet and broadcast content, there are almost no inter-working features between the two delivery means. Another notable point is that more and more TVs and Set-top-boxes (STB) are equipped with huge storage devices and this is essential for the time-shifted consumption of media content. The content storage can be controlled normally by the user or a scheduler to build personal television channels, but still is neither controlled by either network nor influences what happens in the network. In certain cases, providers of Pay-TV-services have started to pre-download content onto the storage devices in order to provide viewers with more choice of programs.

These new capabilities of user terminals, namely the available broadband network access and a storage device with reasonable capacity, may not only be utilized to enhance the user experience, but also to reduce the TV programs delivery cost and to increase both the efficiency of spectrum usage and the energy efficiency of the whole system.

Firstly, taking advantage of the presence of the second delivery means (the broadband network), the ingrained TV viewing habits can be exploited to optimize the TV content distribution. Broadcast is optimal for massive audience, since the network operation cost is almost independent of the size of its audience for a given coverage area, which indicates that the more users it serves, the lower the cost for the individual user remains. In contrast, the cost of broadband delivery increases generally as the viewer number gets larger and in case of unicast the relation is nearly linear. This implies that for those events which have a small audience, delivery via a broadband network may be more cost-efficient.

Moreover, managed by the user terminal, the storage device is able to store the contents which are planned to be repeated by the broadcaster in the following 14 days or so and which the user is predicted to have strong interest to watch. In this way the on-air viewer numbers of repeated TV content can be reduced significantly and the skewness of the channel popularity distribution is considerably reinforced. Suppose that the remaining number of on-air viewers falls below a pre-defined threshold, the content then should be reallocated to the broadband channel, thereby freeing capacity in the broadcast channels or even the spectrum.

Further, due to the fact that TV viewer numbers vary significantly during a day, the freed capacity has also a strong time-dependency. In the prime-time hours freed data rates will be much less than e.g. over night. To make a better use of the spectrum a new delivery strategy is defined, which uses the broadcast capacity over night to pre-transmit some of the TV content to user terminals. At a pre-signaled broadcast time these terminals can then play back the content from their storage device directly. As a result, the number of terminals which have to receive the live broadcast will be lowered and eventually this live content may also be moved to a broadband channel. Similarly, the pre-transmission can also be placed in the broadband channel during low-traffic hours, so the load of the broadband network during day-time can be reduced. The scheduling of Internet Protocol TeleVision (IPTV) content pre-distribution is studied in P. Kreuger, H. Abrahamsson, "Scheduling IPTV content pre-distribution," in: Lecture Notes in Computer Science; IP Operation and Management, vol. 5843, pp. 1-14, Springer, Berlin, 2009.

The freed capacity is extremely valuable for both broadcasters and other wireless communication network operators. The following possible usages can be considered for instance: Deliver more broadcast services; adjust the transmission parameters to a more robust mode, with the purpose that the power consumption of the transmitter can be reduced; and shut down certain broadcast channels temporally and make the frequencies available to secondary wireless service providers for a certain time period.

SUMMARY

It is an object of the present disclosure to provide devices and methods for use in dynamic broadcast as well as a dynamic broadcast system and method that enable an efficient, automatic and flexible transmission of content via a broadcast network and a broadband network.

According to an aspect of the present disclosure there is provided a terminal for use in a dynamic broadcast system comprising:
a broadcast receiver configured to receive content broadcast via a broadcast network,
a broadband receiver configured to receive content obtained via a broadband network,
a storage device that stores received content,
an output unit that outputs received or stored content, and
a management unit that controls said broadcast receiver, said broadband receiver and said storage device to control which content to receive and/or to store and to switch between said broadcast receiver, said broadband receiver and said storage to control which content to provide to the output unit.

According to a further aspect of the present disclosure there is provided a dynamic broadcast system comprising
a broadcast transmitter configured to broadcast content via a broadcast network, a broadband server configured to provide content via a broadband network, a controller that dynamically controls transmission parameters, transmission times and transmission paths used for broadcasting content via said broadcast network and providing content via said broadband network, and a decision unit that dynamically decides transmission parameters, transmission times and transmission paths used for broadcasting and providing content based on monitoring data carrying information on user specific content usage and/or transmission quality data carrying information on the quality of a transmission link between said broadband server and a terminal and/or of a reception of content broadcast by said broadcast transmitter.

According to still another aspect there is provided a control device for use in a dynamic broadcast system for providing content to terminals comprising:

a controller that dynamically controls transmission parameters, transmission times and transmission paths used for broadcasting and providing content by use of a broadcast transmitter configured to broadcast content via a broadcast network and/or a broadband server configured to provide content via a broadband network, and a decision unit that dynamically decides transmission parameters, transmission times and transmission paths used for broadcasting and providing content based on monitoring data carrying information on user specific content usage and/or transmission quality data carrying information on the quality of a transmission link between said broadband server and a terminal and/or of a reception of content broadcast by said broadcast transmitter.

According to still further aspects corresponding methods, including a receiving method, a dynamic broadcast method and a control method as well as a computer readable non-transitory medium having instructions stored thereon which, when carried out on a computer, cause the computer to perform the steps of the method according to the present disclosure are provided.

Preferred embodiments of the disclosure are defined in the dependent claims. It shall be understood that the claimed devices, system, methods and computer readable medium have similar and/or identical preferred embodiments as the claimed terminal and the claimed dynamic broadcast system and as defined in the dependent claims.

The present disclosure supports the provision of true convergence and interoperability of broadband and broadcast networks leading to a significant extension of spectrum usable for wireless broadband systems, preferably inside the UHF frequency band while not jeopardizing the traditional quality of service and quality of experience known from terrestrial broadcasting. By use of the present disclosure the time-varying demand for wireless broadband services can be accommodated in that at times of the day when the less popular TV programs or programs that are repeats of programs first delivered during the last day or days are being played out, more spectrum can be released by the broadcast network operators than during the evenings when the more popular programs are broadcasted. A kind of water filling is made possible through this approach in which the spectrum demands of the wireless broadband and the broadcast networks are mutually optimized.

The present disclosure particularly provides for management/control elements that dynamically control the transmission, storage and use of content via the broadcast network and the broadband network. In particular, the transmission parameters, transmission times and transmission paths used for broadcasting content via the broadcast network and for providing content via the broadband network are dynamically controlled. Through said control the multiplex configurations of the transmission of content (in particular over the broadcast network) can be dynamically controlled including the allocation of content to multiplex content data streams transmitted over the broadcast network or the broadband network.

Further, the use of adequate signalling information or other data is preferably proposed for ensuring seamless presentations of content to the user, automatic control and an efficient use of the available resources, whereby it is provided that any switching between entities used for transmission of content is not realized by a user watching a presentation of content. Thus, the present disclosure supports to provide benefits to all parties in the business chain as follows.

For frequency regulators a possibility to respond to the demand of operators of wireless broadband devices for more spectrum is provided without having to come into the kind of conflict with the broadcast network operators that would result from a Digital Dividend. At the same time, the workload required to resolve problems caused by interference of the traditional White Spaces will be significantly reduced.

Operators of wireless broadband networks will gain more spectrum for their services with a much reduced probability of problems resulting from interference between their networks and broadcast TV networks. They will be able to use higher transmitter power levels in their networks and the amount of spectrum available to them can—in co-ordination with the operator of the broadcast networks—be adapted to their capacity needs.

Operators of broadcast networks will not lose spectrum through a Digital Dividend completely but will be able to keep control of the spectrum available to their services—in co-ordination with the operator of the wireless broadband networks. In addition, the present disclosure provides them the possibility to save energy and cost of operation. Operators of broadcast networks might e.g. choose to lease the dynamically freed spectrum to other users.

The TV viewers will not experience any loss in Quality of Experience in comparison to traditional broadcasting and at the same time retain more choice of programs which would have been restricted through Digital Dividends.

Contrary to terminals, such as a Web-TV, having a broadcast receiver for receiving regular broadcast and a broadband receiver for receiving content via a broadband network, terminals according to the present disclosure comprise a management unit that controls which content shall be received via which network and that further controls from which source (i.e. the live broadcast reception, a live broadband reception or the storage unit) content to provide to the output unit, e.g. for presentation on a screen. This is generally done in a manner that is not noticed by the user who shall generally not realize any difference to the conventional way of consuming media content (in particular the conventional way of watching TV). In conventional terminals like Web-TVs, the user, in contrast, has to actively decide where to get content from and between which sources to switch.

BRIEF DESCRIPTION OF THE DRAWINGS

These and other aspects of the present invention will be apparent from and explained in more detail below with reference to the embodiments described hereinafter. In the following drawings FIG. 5 shows a schematic diagram of a demonstrative environment, FIG. 6 shows a diagram of NiS operations feasible in the demonstrative environment of FIG. 5.

DESCRIPTION OF THE EMBODIMENTS

Figure 1:
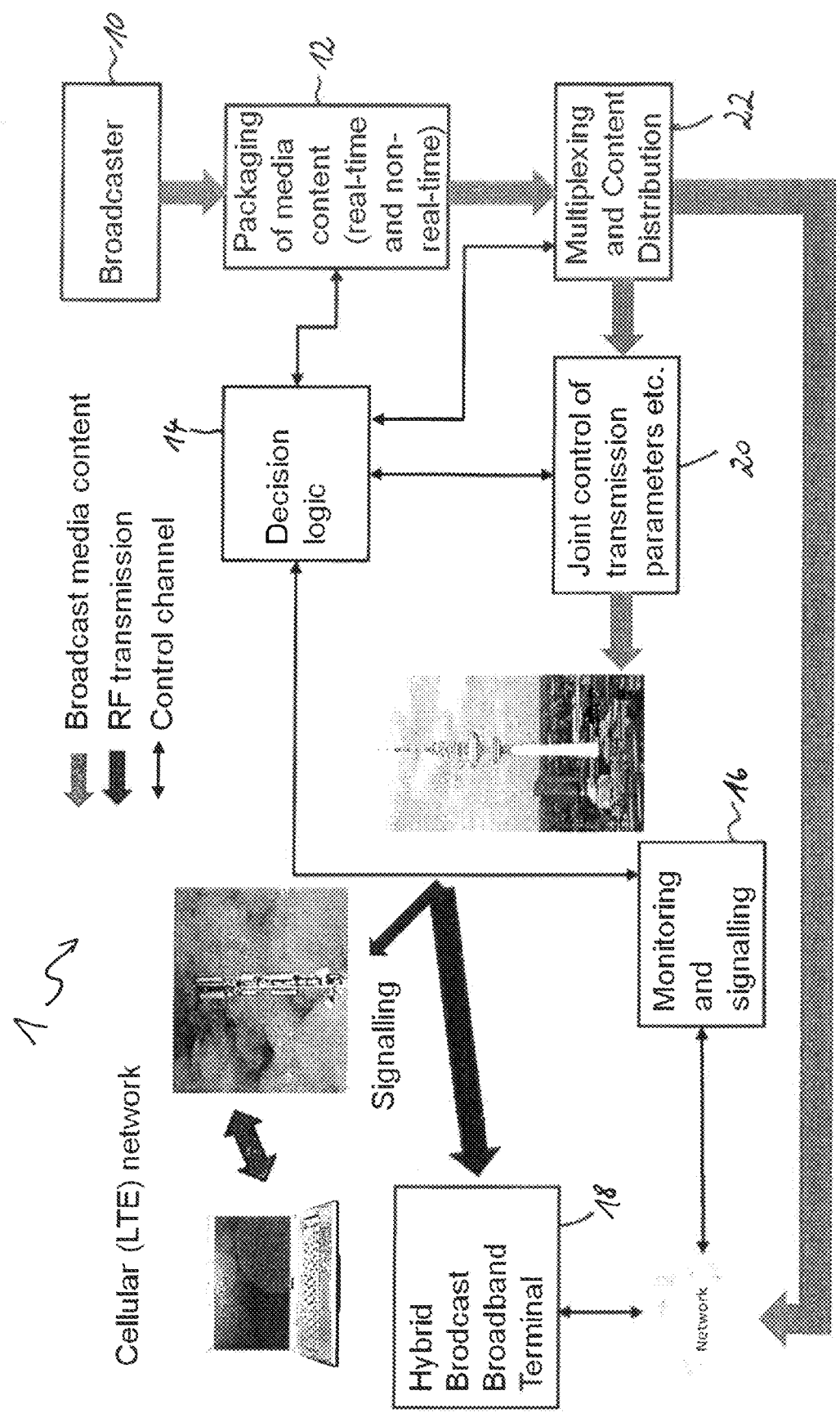
FIG. 1 shows a schematic diagram of the general layout of a dynamic broadcast system.

A schematic diagram of a dynamic broadcast system 1 is depicted in FIG. 1. The system involves a broadcast (BC) network, a broadband network (BB), hybrid broadcast broadband (HBB) terminals and other wireless communication networks. Their cooperation is managed by the dynamic broadcast network. The functions of the blocks shown in FIG. 1 are explained in the following.

First, the packaging of media content unit 12 is described. The TV content is provided by broadcasters 10 and is segmented into Real-Time (RT) and Non-Real-Time (NRT) events. For real-time events, (certain elements of) news programs for instance, their content becomes available only at the announced on-air time, so they have to be delivered live; while for non-real-time events, like movies, music, drama etc., their content may be available in advance, so they can be pre-downloaded. With pre-download (broadcast or broadband) network capacity can be used for instance over night, when capacity has been identified to be available, whereas during daytime and in the evening network capacity will be freed for other uses. The choice of content that can be pre-downloaded will be based on rules used in a decision logic 14. These rules will be generated from usage patterns of viewers derived from information available over the broadband network. In conjunction with other measures the download of such material will take place as network capacity becomes available—either over the broadcast or the broadband network. A program schedule therefore should be created that indicates which content comes over the air in real-time and which content can be played from the storage device in the user terminal.

Next, a monitoring and signaling unit 16 is described. To optimize the network operation, knowledge about actual network usage is important. Two kinds of information should hence be collected from HBB terminals 18 (also called "terminals", "user terminals" or "receivers" hereinafter) and transmitted to the decision logic 14 through broadband connection. The first kind of information is about whether or not programs or pieces of media content are used and by how many people. This popularity can be estimated by monitoring the watching activities of some or all users, as done in today's IPTV networks. Knowing the accurate popularity and usage pattern of the media content can help the decision logic 14 determining which content should be delivered via the broadband network and/or pre-downloaded as mentioned above. The second kind of information is about the momentary technical Quality of Service (QoS) of the transmission links. This can be obtained with integrated measuring devices in HBB terminals 18. With information about the actual signal quality, the decision logic 14 can manage the network most efficiently.

The signaling which delivers data to the HBB terminals 18 will provide information about content items presented for 'delivery in advance' (also called 'offline delivery, i.e. delivery in advance of the official broadcast time), the time of the broadcast transmission and/or the time of play out over the broadband network. It will include a program schedule and it will deliver information about the various parameters selected by the dynamic multiplexing and a joint control unit 20. The signaling information can be transmitted via both networks and in both push and pull modes, so that the HBB terminals 14 can get the current network information even if it is just switched on for the first time.

The decision logic 14 is in charge of the management of the whole network and it aims to keep the operation at a minimal cost while assuring required QoS. Facilitated with the monitoring reports from the HBB terminals 18, and based on additional business rules, cost functions, realistic constraints etc. the decision logic 14 may change the packaging of real-time and non-real-time events, or command a re-multiplexing of the transport streams in broadcast and broadband channels or adjust of the transmission parameters and transmitter power. Before the decision logic 14 has made any changes to the previous program schedule or network settings, it should acknowledge all HBB terminals 18 about the modification through signalling.

Next, a multiplexing and content distribution unit 22 is described. The flexible distribution of media content through broadcast and broadband network requires content items and complete or partial audio, data and video programs to be multiplexed dynamically. In consequence, the former fixed mapping between transmission parameters and TV programs has to be eliminated. Information about such re-multiplexing should be signaled to the HBB terminals 18, so that they are able to follow the changes. By the reason that the popularity of the different TV programs in one transport stream changes continuously, re-multiplexing may take place online, which means some content being transmitted may be reallocated in other physical channels or still in the current channel but with new transmission parameters. All these actions should be carried out in a way unnoticeable by the users.

Next, the joint control unit 20 for control of transmission parameters is described. In traditional digital broadcast systems the modulation of the transmitted signal and the degree of Forward Error Correction (FEC) used are decided once and they then stay stable. The transmitter power is selected according to the coverage requirements of the network. In terrestrial networks, the coverage area is defined by the aforementioned parameters and in addition by the coverage pattern determined by the transmit antenna. This static network planning leads to inefficient usage of the valuable spectrum, because strong time-variant factors like channel popularity and user terminals receiving conditions have not been taken into consideration.

Dynamic multiplexing can reduce the useful data rate transmitted on a specific channel if the multiplex on that channel is not fully loaded with program items at the moment.

Initiated by the decision logic 14 the joint control unit 20 will then change the FEC settings and/or modify the modulation scheme used on that channel. This will result in an enhanced robustness of the signal which in consequence will allow the transmitter power to be adapted thus reducing the power density—and the cost of transmission. This creates economical benefits, as well as ecological benefits, since the exposure to radiation and carbon emission will be reduced as a consequence of the lowered transmitter power. In another case, it shall be supposed that signaling provided from user terminals to the broadcast network including information about technical parameters of the received signal in networks indicate a better-than-required or worse-than-required signal quality as a result of changes in man-made noise (i.e. noise generated by any devices used by anybody in the environment)—which has been found to fluctuate greatly and periodically over time—or due to changes in weather conditions. Initiated by the decision logic 14 the joint control unit 20 will modify the parameters (FEC, modulation, transmitter power) in order to accommodate broadcast QoS at a minimum cost. In addition, the joint control unit 20—in negotiation with dynamic multiplexing via the decision logic 14—will initiate the reconfiguration of multiplexes such that the data rate transmitted in heavily disturbed channels will be reduced and the robustness of the signal enhanced as required.

In the HBB terminal 18 some content will have to be stored "off-line" upon receipt of the appropriate downstream signaling and besides, which content to store should also be decided by the HBB terminal 18. Therefore it should be capable of predicting user's preferences, storing relevant TV content automatically and managing the stored content dynamically. To accomplish this, a recommender system should be implemented in the HBB terminal 18. On the other hand some content will be made available via the co-operating broadband network. The HBB terminal 18 will receive a program schedule, and a delivery network indicator which indicate for which period of time and how often this stored content is to be used instead of content that in traditional broadcasting would be received live. In addition it will be informed via which of the co-operating networks content will be delivered. The received content from different networks should be managed properly by the HBB terminal 18. Content items are often interrelated. This is obviously true for audio and video but in addition, a plethora of data services like software applications are created by the content owners that will have to be available in the terminal 18 and started, paused or cancelled in relation to the audio and video content. Additional down-stream signaling information embedded in the broadcast stream is received by the HBB terminal 18, which indicates the dynamic multiplex configurations and the parameters selected by joint control. Upstream signaling will be generated in HBB terminals 18 for transmission on the broadband network. The user terminal 18 thus becomes an active component of the dynamic broadcast network instead of being a passive device as in traditional broadcasting.

Spectrum freed by dynamic broadcast can be offered to secondary wireless networks, like Cellular (LTE), Wi-Fi, etc. for a certain period of time. To avoid interference, usage of the new "white space" created by dynamic broadcast should be coordinated through resource signaling which is an output of the dynamic broadcast system 1 and informs wireless network operators about the dynamically chosen parameters of the broadcast network. It includes also information about the period of validity of the multiplex configuration and the spectrum resources which will be freed including an indication of the period of time during which the spectrum will be available.

Figure 2:
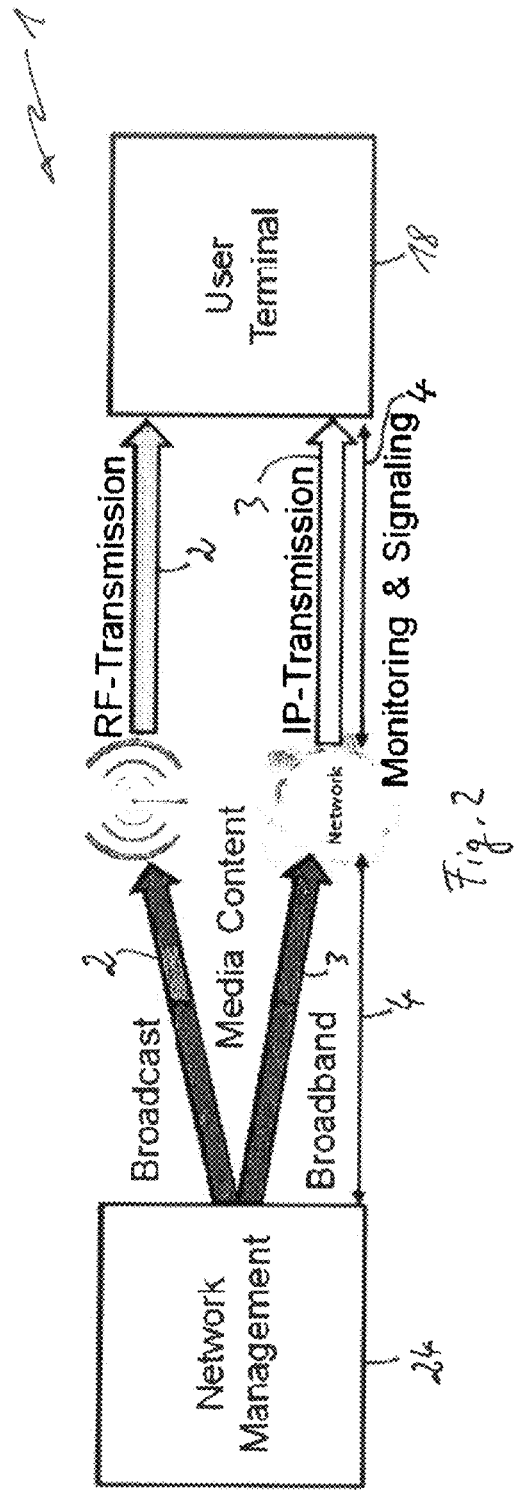
FIG. 2 shows a simplified schematic diagram of a dynamic broadcast system.

FIG. 2 shows a simplified diagram of a dynamic broadcast system 1. The user terminal 18 shall be able to display any media content received via either of the two delivery paths 2, 3. The control channel 4 allows the Network Management Unit (NMU) 24 to monitor the actual media consumption and to inform user terminals if transmission parameters are modified.

As the user should be able to select the TV service of his choice at any moment in time, a List of all Services (LoS) available in the network is stored in the device (user terminal 18). Nowadays TV services are assigned to fixed physical and/or logical channels. In Digital Terrestrial TV (DTT) for example, the transmission parameters for all Transport Streams (TSs) available in the network are carried inside the Network Information Table (NIT). In addition the identifiers (IDs) and descriptors for all services inside a single TS are given by the NIT and the Service Description Table (SDT) in this TS. As the channel configurations are static, a receiver only has to scan through all available TSs the very first time it is switched on. During the process, the names of all services and the corresponding transmission parameters can be saved in a static LoS. In dynamic broadcast, these assignments will no longer be static, so that a dynamic LoS is created out of the provided Signaling Messages (SMs) containing scheduling information and event-based information for service discovery. The end point of an event and the start point of a new event will thereby be defined by the point in time when the changes to the transmission parameters of a single TV service take place. This means that events are not necessarily restricted to whole programs but could consist of various programs or be a subunit of only one program. Each event then could be described as "broadband event" or "broadcast event". This means further, that there is the need for unique content IDs which allow to identify a certain piece of media content or even a content component (e.g. a single audio or video stream, a subtitle of a certain language or a data service) uniquely. By this means, an event then can be assigned to single or multiple content components so that the TV service during this event can be created out of these content components. The set of specifications described in ETSI TS 102 822-2 V1.4.1, "Broadcast and On-line Services: Search, select, and rightful use of content on personal storage systems ("TV-Anytime"); Part 2: Phase 1—System description", pp. 1-127, November 2007 and ETSI TS 102 822-3-1 V1.6.1, "Broadcast and On-line Services: Search, select, and rightful use of content on personal storage systems ("TV-Anytime"); Part 3: Metadata; Sub-part 1: Phase 1—Metadata schemas," pp. 1-190, July 2010 provide promising approaches to overcome this task by adding some extensions to the existing framework.

All SMs and updates to previous messages shall then carry a version number or a timestamp referring to a common time base so that the latest information can be distinguished from that of older messages. SMs shall be embedded in the TSs and be repeated periodically or be available for download from servers with pre-defined IP connection data as the user terminals need to know which TV services are available in which of the networks and where. Otherwise, conflicts might occur for example when a user terminal is switched on for the morning news after it had been turned off during the night. SMs, the mechanisms for purchasing them as well as the corresponding update protocols need to be standardized so that all user terminals inside the network are able to interpret all received SMs correctly and to get access to missed updates if there is a lack of information. By updating continuously, the linear TV services can be built up directly inside the user terminals according to the schedule and the corresponding event information. Thereby the user terminal can be instructed to switch the distribution channel over which the single events of a TV service will be delivered. Such switching operations are called Network initiated Switching (NiS). It has to be mentioned, that the user will not be informed about these processes. Only the names of the available services and a corresponding Electronic Program Guide (EPG) will be forwarded to him/her, so that the complexity of the underlying distribution mechanisms will be hidden by the terminal.

NiS differs from a user initiated channel change, as it does not result in displaying a different media content but in a seamless transition to the same media content—delivered over a different channel. As any service interruption would be annoying, the whole process is performed in a way unnoticeable for the user. Therefore, the respective media content is received on both delivery paths simultaneously for a short period of time. At the end of this phase of parallel delivery, the NiS is completed so that the original reception channel can be shut down by the Network Management Unit (NMU).

In dynamic broadcast, a user terminal is preferably able to perform different types of NiS requiring vertical handovers between the broadband and the broadcast network or a horizontal handover in the broadcast network. Broadcast/broadband NiS is performed if the broadcast of a certain service will be stopped and instead, a multicast or unicast delivery of the same service has been started. Broadband/broadcast NiS is performed if a multicast or unicast of a certain service will be stopped and instead broadcast delivery of the same service has been started. Broadcast/broadcast NiS is performed if the broadcast of a certain service on a certain channel will be stopped while the broadcast delivery of the same service on a different channel has been started.

The last named NiS operation could also be substituted by sequential processing of a broadcast/broadband NiS and a broadband/broadcast NiS. Further explanation of these switching operations and the description of an implementation of these processes will be provided below, where live delivery network switching will be explained.

As already mentioned above, user terminals will have sufficient storage capacity available to store a large number of programs. This storage space either could be provided by a built-in hard disk or by a network attached storage, which is integrated into the home network. Parts of this storage capacity might be available for providing functionalities of a personal video recorder but a defined part of the storage space needs to be allocated for enabling pre-transmission mechanisms of dynamic broadcast which allow to distinguish a contents delivery time from its presentation time.

First, there are programs which are predicted to be of interest for a large number of viewers and which in addition are already available for distribution before their presentation time according to the schedule and which hence can be seen as Non-RealTime (NRT) content. To name a famous example: "Tatort" would be such a program as it is a movie that is seen by millions of viewers on Sunday evenings in Germany. In 2010, 13 of the 15 most successful movies in German TV had been Tatort episodes. If these types of programs would be made available as pre-download over broadcast, e.g. during the low-traffic hours the night before, the user terminals could be instructed to record the program before its presentation time. This is called network initiated recording (NiR). Then the playback of the content from the storage device would replace online receiving of the corresponding event. Thus, the number of viewers that watch the program online would be reduced and only the terminals that missed the pre-download would have to receive the live event. The whole event thereby could be moved to broadband whereas capacity would be freed in the broadcast network.

Secondly, there is NRT content that might be of lower interest for the majority of users but where in contrast a strong interest in watching this program might be predictable for a specific user or a group of users. For classifying these types of content and for defining user groups, data about the individual media usage can be recorded inside the user terminals and partly be shared with the decision logic. As a result, content that is more specific could be provided as a pre-download via broadband during low-traffic hours which would reduce the load of the broadband network at the presentation time of the content. One way of predicting a user's interest in a certain program is to use the outcomes of a recommender system. In principle, the recommender system should make use of implicit feedback (usage history) as well as of explicit feedback (user feedback). Both can be supported by the data structures described in ETSI, "ETSI TS 102 822-3-1 V1.6.1," Broadcast and On-line Services: Search, select, and rightful use of content on personal storage systems ("TV-Anytime"); Part 3: Metadata; Sub-part 1: Phase 1—Metadata schemas, pp. 1-190, July 2010. Personalization also offers the possibility to automatically record a users favorite programs which then can be integrated into a database of old-NRT content, so that e.g. episodes of favorite series can be added to a local video on demand platform or be played back from the local storage in case of repeats. Old-NRT content describes content, which might already be available on the terminal's side as it is a repeat of a program, which had already been distributed during the last days.

To sum up, the requirements (challenges to user terminals and the dynamic broadcast environment) could be rephrased as follows:

If the terminal is switched on (maybe for the first time) it needs to be known which TV services are available in the network and where.

Changes to the transmission parameters for a certain service mark the start and end points of events, which have to be signaled to the terminals.

Certain pieces of content should be labeled by unique IDs so that events can be created out of several content components.

NiS requires algorithms for a synchronized reception of the same media content from different media sources.

Efficient network management requires reliable recommender systems on the user terminals side, so that the most appropriate content may be delivered in advance.

System related data will not be forwarded to the users.

Figure 3:
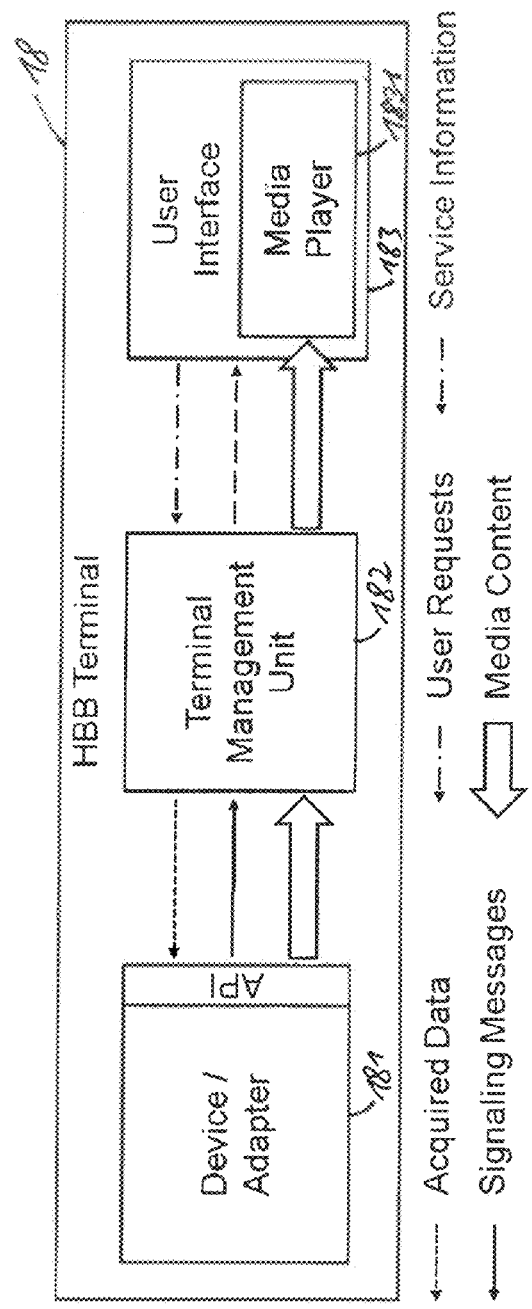
FIG. 3 shows a schematic diagram of a terminal according to the present disclosure.

In the following, a conceptual architecture for a HBB terminal 18 is described, which aims to meet the requirements introduced above. The three main modules of the HBB terminal 18 are depicted in FIG. 3. The module device/adapter 181 describes the hardware set-up of the HBB terminal 18 offering accesses to both, a broadcast and a broadband network, as well as to a built-in storage. In a practical embodiment these are a DVB-T receiver, a network interface controller and a hard disk. Assisted by the operating system and some device specific Application Programming Interfaces (APIs) data can be read from these devices (media content, signaling messages) and sent to the decision logic (acquired data).

The Terminal Management Unit (TMU) 182 is responsible for the managed buffering of the received Audio/Video (A/V) content and the seamless switching between the media sources. To perform these tasks EPG data and dynamically changing channel configurations provided by the decision logic 14 as signaling messages have to be interpreted. A detailed description on how to realize such processes seamlessly and unnoticeable for the user will be provided below.

The TMU 182 also generates output data, which are measurement reports containing information about the media services watched currently, users preferences and the currently available QoS.

To display the media content the data are forwarded to the user interface 183. In case of A/V data these are passed to a media player 1831 while service information can be used to build up an adequate graphical user interface in order to enable user requests for example for channel switching or accessing a Personal Video Recorder (PVR). For that purpose, a list of the available TV channels is created and updated by the TMU 182 if changes occur. The recommender system is based on user feedback, program ratings and channel watching history. As it is not important how a certain piece of content is delivered, as long as it is available at a certain time, the complexity of the architecture of the heterogeneous network should be hidden from the user. Therefore, it has to be emphasized, that in a dynamic broadcast environment some of the local storage capacity is preferably reserved for recordings programmed by the decision logic 14, so that the transmission in advance of NRT events can be made possible. The playback of such content is then controlled by the TMU 182 in relation to the received metadata embedded in the signaling messages.

Figure 4:
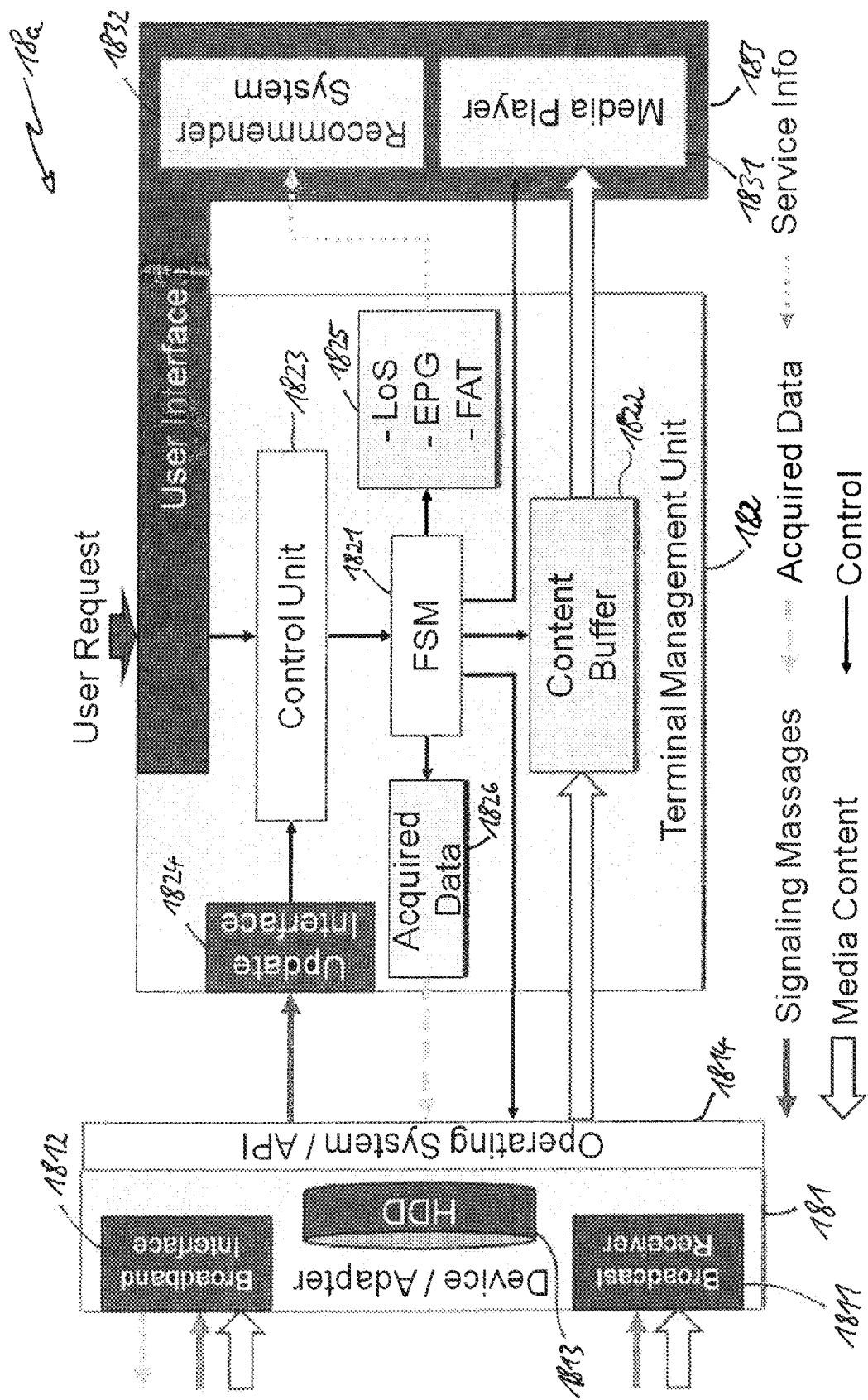
FIG. 4 shows a more detailed schematic diagram of an embodiment of a terminal device according to the present disclosure.

As shown in FIG. 3, illustrating the internal flow of data inside the user terminal, data are first read from a storage or receiving device. After being processed in the Terminal Management Unit 182 selected data are then routed towards the User Interface 183 (UI). FIG. 4 shows a more detailed block diagram of an embodiment of a terminal device 18*a* according to the present disclosure. It can be seen from FIG. 4 that in case of A/V data this would result in displaying them by help of a standard media player application while service specific data are passed to the recommender system engine providing the graphical interface for User initiated Switching operations (UiS) and recording functionalities. In the following, the functionalities of all modules will be described in more detail.

With respect to FIG. 3 and FIG. 4, the module named Device/Adapter 181 contains all the media sources, which includes broadcast receiving equipment 1811, a broadband interface 1812 as well as a built-in hard disk 1813. As the functionalities of the TMU 182 are preferably implemented in software the several devices can be accessed and controlled by making use of the operating system and some device specific APIs 1814.

The heart of the TMU 182 is a Finite State Machine (FSM) 1821 which interacts with the media sources in order to read the content and to obtain SMs, which might arrive via broadcast or broadband. A/V data are passed through a managed buffer 1822 before they are delivered to the media player 1831 whereas SMs are directed to a Control Unit (CU) 1823 by the Update Interface 1824. Thereby internal data are updated. Such an update might affect data that are relevant for the user, like EPG data or the LoS 1825. In this case, the UI 183 has to be refreshed. It might also be the case, that the TV service that is currently watched by the user is affected by changes. This would mean that the end of the event the user is following currently is imminent while the next event is about to begin. This would then result in a NiS. Therefore the CU 1823 has to translate the incoming SMs to well defined instructions, so that a controlled transition of the FSM's status can be realized. In case of NiS, this would include a synchronization (sync) process, which will be explained below. It is also possible that the terminal 18*a* is instructed to record a certain piece of content which is going to be pre-transmitted and which afterwards has to be appended to the database. These processes (NiR) have to run in parallel but are also started, interrupted and stopped by changeovers between different states of the FSM 1821. If the recording is finished, eventually the file allocation table (FAT) has to be updated.

User requests may also enter the CU 1823 and equally lead to status modifications once they are interpreted. First there is UiS as a result of the users wish to watch another program. Secondly, there are user requests for selecting a program for recording, named User initiated Recording (UiR). As the user is not informed about whether a certain TV service is currently transmitted via broadcast or broadband, both processes have to be controlled by the TMU 182. Looking at UiS, the CU 1823 has to extract the relevant information from the LoS and to initiate the corresponding status transition, which might end up in one of the following states:

The user is watching a broadcast event.
The user is watching a broadband event.
The user is watching an event that consists of content, which is already stored on the hard disk.

In contrast to NiS, UiS will result in a short interruption, but this is well known and accepted as long as the waiting time is not too long. Obviously, the resulting state of the FSM 1821 has an impact on what kind of processes can run in parallel. It is suggested that there is sufficient data rate available in the broadband network and that in addition there are two broadcast tuners built into the terminal 18*a* so that at any moment in time one program can be watched while another is being recorded. However, even with this assumption made, not every conflict between user initiated actions and network initiated actions can be avoided, so that there is the need for a command hierarchy inside the terminal 18*a* which can be stated by: "User initiated actions always go before network initiated actions." Only if this is taken into consideration the terminals feedback will be reasonable to the user as some processes (NiS and NiR) only run in the background and which therefore are unseen by the user. If the command hierarchy is taken into account, only one potential conflict will not be solved. This is when there is a running NiR or UiR process recording a broadcast event. In this case, a broadcast/broadcast NiS cannot be performed because both broadcast tuners will already be in use. That is why the dynamic broadcast system should always provide the possibility to replace a broadcast/broadcast NiS by a combination of a broadcast/broadband and a broadband/broadcast NiS, so that even a user whose terminal is currently in this critical state will not see any interruption of the running program.

Of course, the user can also switch off the terminal. The resulting state then would be "Standby" or "Off". "Standby" would still allow updates, NiRs and UiRs while "Off" would completely disable them.

The Acquired Data 1826 (also called "system signaling information") describe the output data generated by the user terminal 18*a* composed of system specific data, like the current QoS, and user specific data. The last named may contain information about the media services watched currently or measurement reports of the recommender system 1832 like channel switching statistics and the users preferences. These data are of particular importance as the prediction of the user's behavior has a great impact on the performance of the dynamic broadcast system.

To show how NiS can be realized a demonstrator, which provides one TV service via three different transmission channels, has been developed. It shall be noted that the layout of the demonstrator(s) explained hereinafter shall also be understood as embodiment of the layout of practical embodiments of a terminal and/or other elements of a dynamic broadcast system. The user terminal is thereby enabled to switch between these three transmission channels. The sync process which is required if a NiS needs to be performed is explained below while the demonstrative environment 100 shown in FIG. 5 is introduced in the following, making reference to FIG. 6 showing NiS operations feasible in the demonstrative environment 100.

It can be seen from FIG. 6 that TV service 1 can be received via three different transmission channels, named BC-1, BC-2 and BB-1. DVB-T is used for the broadcast transmission of BC-1 and BC-2. The broadband transmission of BB-1 is realized by User Datagram Protocol/Internet Protocol (UDP/IP) encapsulation of TS packets. This implies that all A/V data are packetized into MPEG-2 TS containers. The A/V data are encoded by making use of MPEG-2 source coding. To provide an environment where one and the same live TV service can be received via these three different transmission channels the redistribution of TV service 1, which is a free-to-air TV service, is implemented. This can be seen from FIG. 5. The process of redistribution thereby does not include any A/V recoding, only TS remultiplexing is done in order to adapt to the data rates available in BC-2 and BB-1. This means that the A/V payload for TV service 1 is equivalent in all of the three TSs. BC-1 is a free-to-air DVB-T channel which is available in the region of Braunschweig/Hannover and which is transmitted at 490 MHz using a 16-QAM modulation scheme, an 8 k FFT, a guard interval of ¼ and a coding rate of ⅔ for the forward error correction (FEC). This results in a data rate of approximately 13 Mbit/s, so that four TV services can be carried inside the TS. BC-2, which is transmitted at 634 MHz, includes TV service 1 and 2. The data rate of this TS lies below that of BC-1 at 10 Mbit/s due to the usage of another FEC coding rate of ½. The data rate for the broadband transmission was set to 6 Mbit/s, which is slightly higher than the data rate, which is required for TV service 1 (≈4 Mbit/s). By the help of this set up an artificial scenario is created where the phase of a parallel delivery of a TV service via multiple transmission channels is permanent. The mechanisms for NiS, which are an essential requirement to user terminals in dynamic broadcast can thereby be demonstrated, as the described network conditions required at the point in time when there is a transition from one event to the other are present.

As already mentioned the user terminal has been implemented on a PC system. A network interface controller and two DVB-T receivers provide the required connectivity. FIG. 6 shows which switching operations are feasible in the demonstrative environment described above. NiS-1 and NiS-6 are broadcast/broadcast NiS operations whereas NiS-2 as well as NiS-4 is broadcast/broadband NiS and NiS-3, NiS-5 is broadband/broadcast NiS. This means that all NiS operations introduced above and the required handover mechanisms can be realized in the experimental environment.

Figure 7:
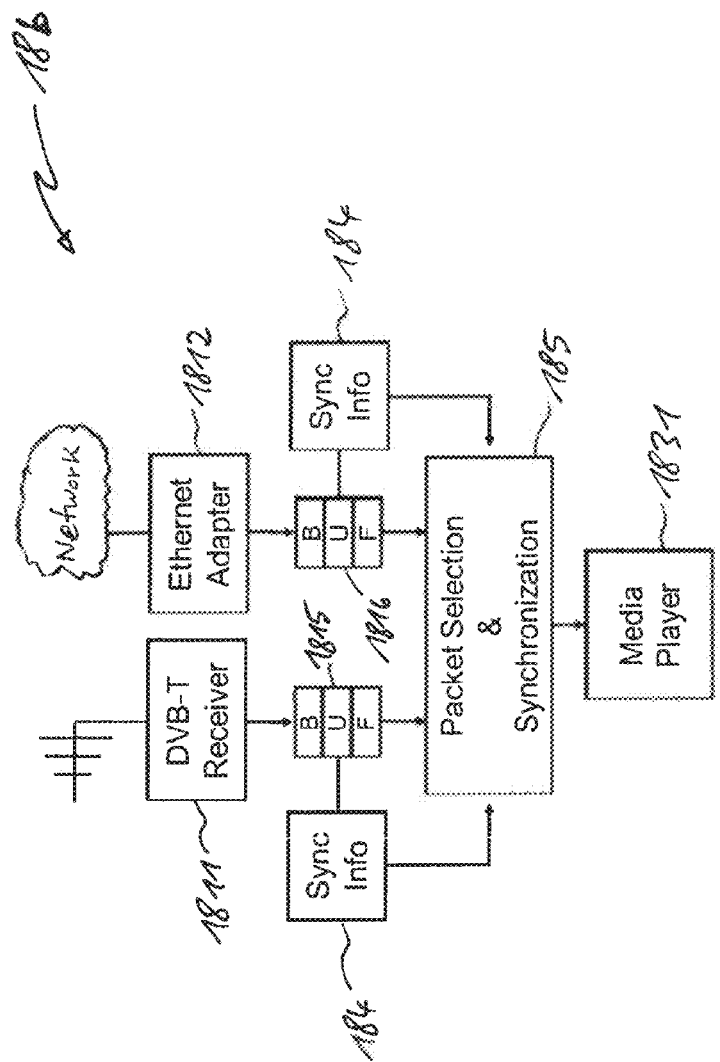
FIG. 7 shows a schematic diagram of another embodiment of a terminal.

Next, it will be described how the sync process during a NiS can be performed if the correct interpretation of an incoming SM like introduced above is assumed. Firstly, a second receiving device has to be activated in addition to the device, which is currently used for the reception of the running TV program. As an example if referring to FIG. 6, NiS-2 would mean, that the currently active device is a broadcast receiver while it would also imply that the device, which has to be activated for this NiS, is the broadband interface. During NiS the two TSs received by these two devices need to be linked together as otherwise visible distortions might occur due to packet-loss. FIG. 7 shows a schematic diagram of another embodiment of a terminal 18b. It is illustrated how two TSs can be received from the two different sources in parallel. The example depicted is showing the simultaneous reception of the same TV service via two different transmission paths, which are namely a DVB-T channel and a point-to-point connection over the IP network. The terminal 18b comprises a DVB-T receiver 1811 and an associated buffer 1815, an ethernet adapter 1812 and an associated buffer 1816, synchronization information 184, a packet selection & synchronization unit 185 and a media player 1831.

Because of a delay, which might be present between the two corresponding TSs, a certain number of IS packets of both streams need to be buffered for a short period of (overlap) time. In an embodiment of a dynamic broadcast system a maximum value according to this delay is defined so that NiS can be performed in all of the scenarios introduced above. In the demonstrative environment shown in FIG. 5, there is a variable delay between the three transmission paths, which deviates from the process of redistribution. The value of this delay can go up to 4 seconds. The number of TS packets available in the buffer hence is set to 12000, corresponding to approximately 4.5 s of an SD TV service if a data rate of 4 Mbit/s is assumed. From the stored TS packets any information needed for the sync process can be extracted. Of high relevance are for example the order of audio and video packets in both multiplexes as well as the values of the Program Clock References (PCR) and the corresponding presentation and decoding time stamps (PTS, DTS). According to the assumptions made above, it has to be emphasized that the A/V data carried in both TSs are identical. If so, a merged TS can be created out of the two input streams and being forwarded to the media player. Possibly some TS packets are rearranged and/or restamped so that a distortion-free playback can be achieved during decoding by the media player. The requirements for the synchronization process therefore can be summarized as follows:

Every TS packet in the continuous output stream should be unique.

Timebase discontinuities should be indicated.

Every PTS and DTS should refer to a valid PCR value.

Next, a summary of the content delivery mechanisms that are used in dynamic broadcast are described. In dynamic broadcast, the live delivery of content can be realized either via a BC network or via a BB network. Each TV service (except virtual channels) can be received live via one of these networks at any point in time. Thereby, the distribution channel for each TV service is determined by the network management system. Changes to the transmission parameters for the TV services available in the dynamic broadcast network are determined by the network management system and signaled to the receivers. Such changes lead to Network initiated Switching (NiS)—a process performed by the receivers, which results in a seamless transition to another distribution channel. In dynamic broadcast, a TV service can be moved from a BC channel to a BB channel (NiS-2-BB) or vice versa (NiS-2-BC). In order to allow for a flexible configuration of the BC multiplexes, it is also possible to move TV services between different BC channels. Such switching of the BC channel can be performed directly in case that there is an additional BC tuner available in the receiver. In order to accommodate receivers that have only a single BC tuner, the TV service will be transmitted additionally via BB for a short period, so that the (direct) NiS-2-BC can be substituted by a sequential processing of NiS-2-BB and NiS-2-BC. As the distribution channel can be changed at short notice, the following requirements will have to be met:

If the TV service currently watched is received via BB, a BC tuner shall be in stand-by, so that a NiS-2-BC can be performed at any time.

If the TV service currently watched is received via BC, enough capacity of the BB connection shall be reserved to allow for the reception of the same TV service, so that a NiS-2-BB can be performed at any time.

In addition to the live delivery of TV content via the heterogeneous network, there are non-real-time delivery mechanisms in dynamic broadcast, which can make use of either of the networks. Firstly, there is the pre-transmission via BC, which aims to distribute a certain piece of content to all terminals able to receive the BC signal. Secondly, there is the pre-download of content via BB, which is performed by terminals whose users are predicted to have a strong interest in watching a specific piece of content. Both delivery strategies aim to replace the live reception of content at the presentation time according to the broadcast schedule by enabling the receivers to Play back pre-stored Content (PbC).

In order to avoid the multiple transmission of content, which is repeated by the broadcaster, receivers can also be instructed to record the live stream during its first play out. As the distribution channel might change during this process, NiS has to be performed inside the receiver to guarantee for uninterrupted recording.

From the perspective of the receiver, the delivery techniques described above can be termed as Network initiated Recording (NiR). These processes are planned and scheduled by the network management. However, the number of BC tuners and the BB capacity available on the receiver's side will differ between households. Thus, a number D' of programs has to be selected for recording as a subset of all indicated live and pre-transmitted programs D. Supposed, that the users (or group of users) interest in the individual programs can be predicted, D' can be found and the recordings can be scheduled by the method proposed in J. Korst, V. Fronk, M. Barbieri, W. Verhaegh, and W. Michicls, "Scheduling TV recordings for a recommender-based DVR," 2010 IEEE 14th International Symposium on Consumer Electronics (ISCE), pp. 1-6, July 2010, assuming that a pair of one BC tuner and one BB channel needs to be reserved for interruption-free recording.

Figure 8:
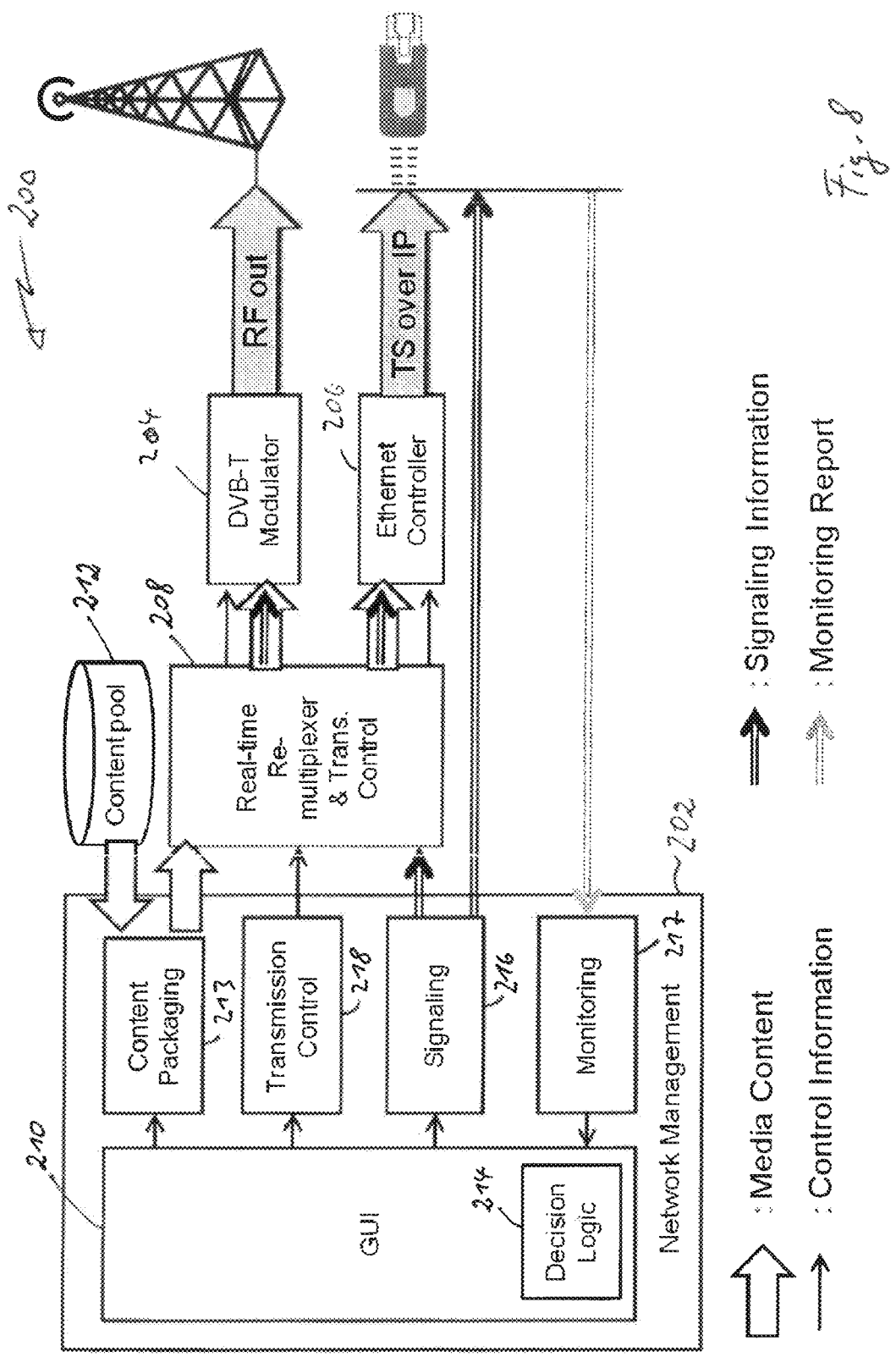
FIG. 8 shows a schematic diagram of a network management unit of dynamic broadcast system.

FIG. 8 provides a high-level block diagram of the internal hardware and software components of another embodiment of a demonstrator 200, but also explains which elements are used in practical embodiments of a dynamic broadcast system. In the system demonstrator, the BC transmission of media content is carried out using DVB-T, whereas a User Datagram Protocol (UDP) is used to deliver media content via the BB link. Signaling information 216 can be embedded inside the Transport Streams (TS) or be sent as separate messages via the bidirectional BB connection.

The network management unit 202 is equipped with play out equipment, namely a DVB-T modulator card 204 (representing an embodiment of the broadcast transmitter) for generating the BC signal and an ethernet controller 206 (representing an embodiment of the broadband transmitter/server from which the content can be actively provided ("transmitted") to a terminal and/or passively "provided", e.g. for download by a terminal). Both devices are controlled by a real-time (Re-) multiplexing unit 208 (e.g. programmed by software).

As can be seen from FIG. 8, the network management application 202 can be controlled by a graphical user interface (GUI) 210. Thereby, the dynamic broadcast TV service can be started/stopped and the media content to be transmitted can be selected out of a content pool 212, which provides a set of locally stored DVB TSs containing standard definition (SD) TV programs. The selected content is then packed as described above in a content packaging unit 213 before it is provided to the multiplexing unit 208. Further, NiS and NiR can be triggered. The decision logic 214 allows simulating the optimization processes performed in a dynamic broadcast network. Therefore, input data describing the behavior of large audiences are emulated and combined with the monitoring reports received from the implemented receiver at the monitoring information receiver 217. The transmission parameters 218 are adapted as an outcome of the optimization algorithms and signaling messages are sent to the receiver accordingly.

Figure 9:
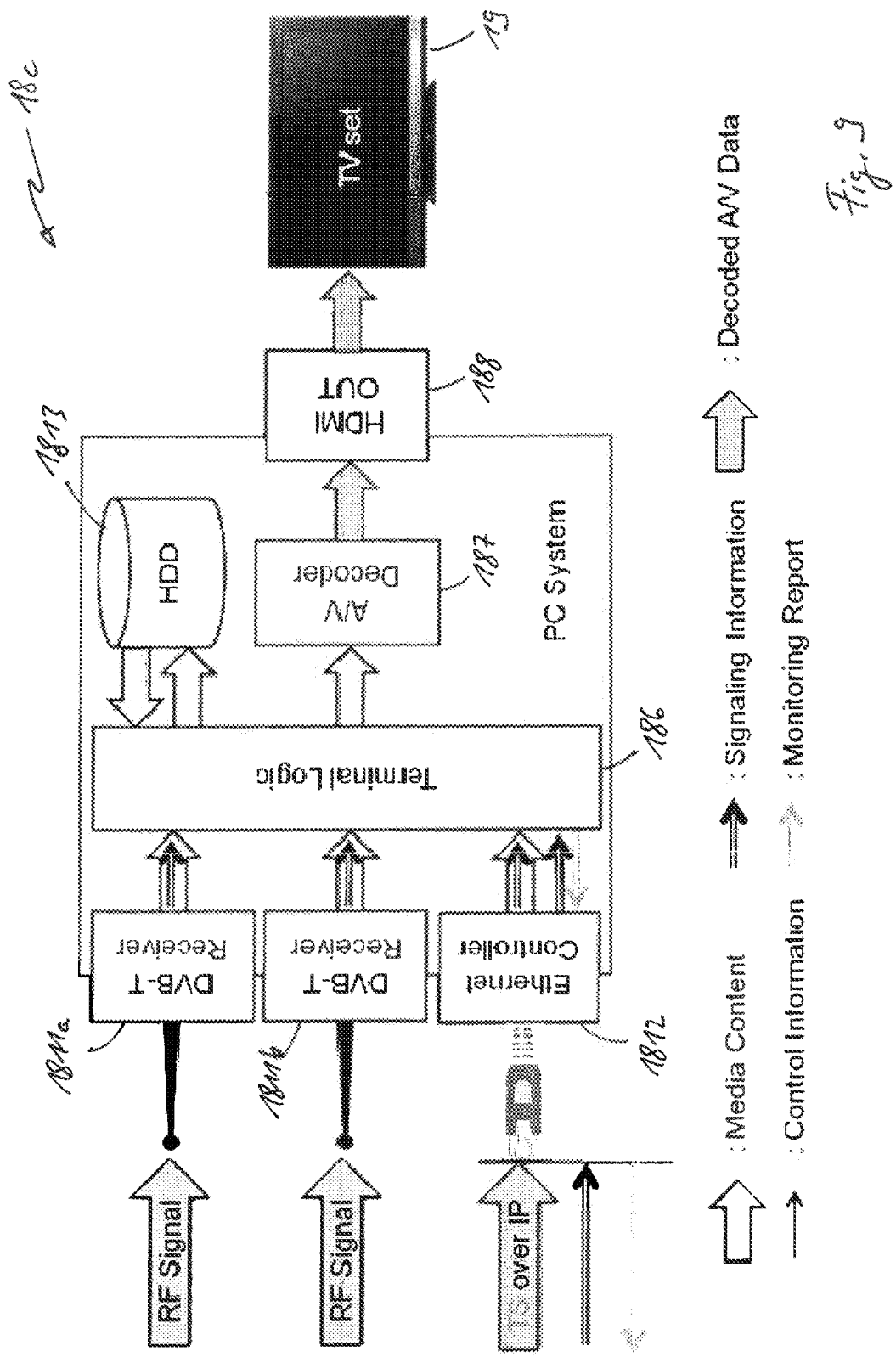
FIG. 9 shows a schematic diagram of another embodiment of a terminal.

FIG. 9 shows another embodiment of the receiver (user terminal) 18c according to the present disclosure, which is equipped with two DVB-T tuners 1811a, 1811b and an Ethernet controller 1812. Thereby, the RF signal as well as the UDP stream(s) provided by the network management unit can be received. Signaling messages can be obtained and monitoring reports can be sent via a bidirectional IP connection.

The central software module of the receiver is the terminal logic 186, which can be described as a finite state machine (FSM) interacting with the DVB-T tuners 1811a, 1811b, the Ethernet controller 1812 and the local Hard Disk Drive (HDD) 1813. These devices provide the input data to the terminal logic 186. The main functionality of the terminal logic 186 is to automatically select the proper source for receiving the media content to be displayed and to be recorded. Therefore, incoming signaling messages are analyzed. The output of the terminal logic 186 are media content data, which are either written to the HDD 1813 where they are stored for later playback or routed towards a standard media player 187, which does the audio and video decoding of the content currently being watched. For displaying the media content, a TV set 19 is connected via the HDMI interface 188 of the receiver 18c.

In the following it is explained how the signaling messages obtained from the network management have effect on the FSM. Thereafter a detailed description of how media content data are processed by the terminal logic depending on the state of the FSM is provided.

Based on the conceptual architecture of a receiver described above with reference to FIG. 4, a software module is provided that manages the interaction between the media sources available to the receiver, which in this case are an Ethernet connection, two DVB-T tuners and a HDD with a storage capacity of 1 TB.

Figure 10:
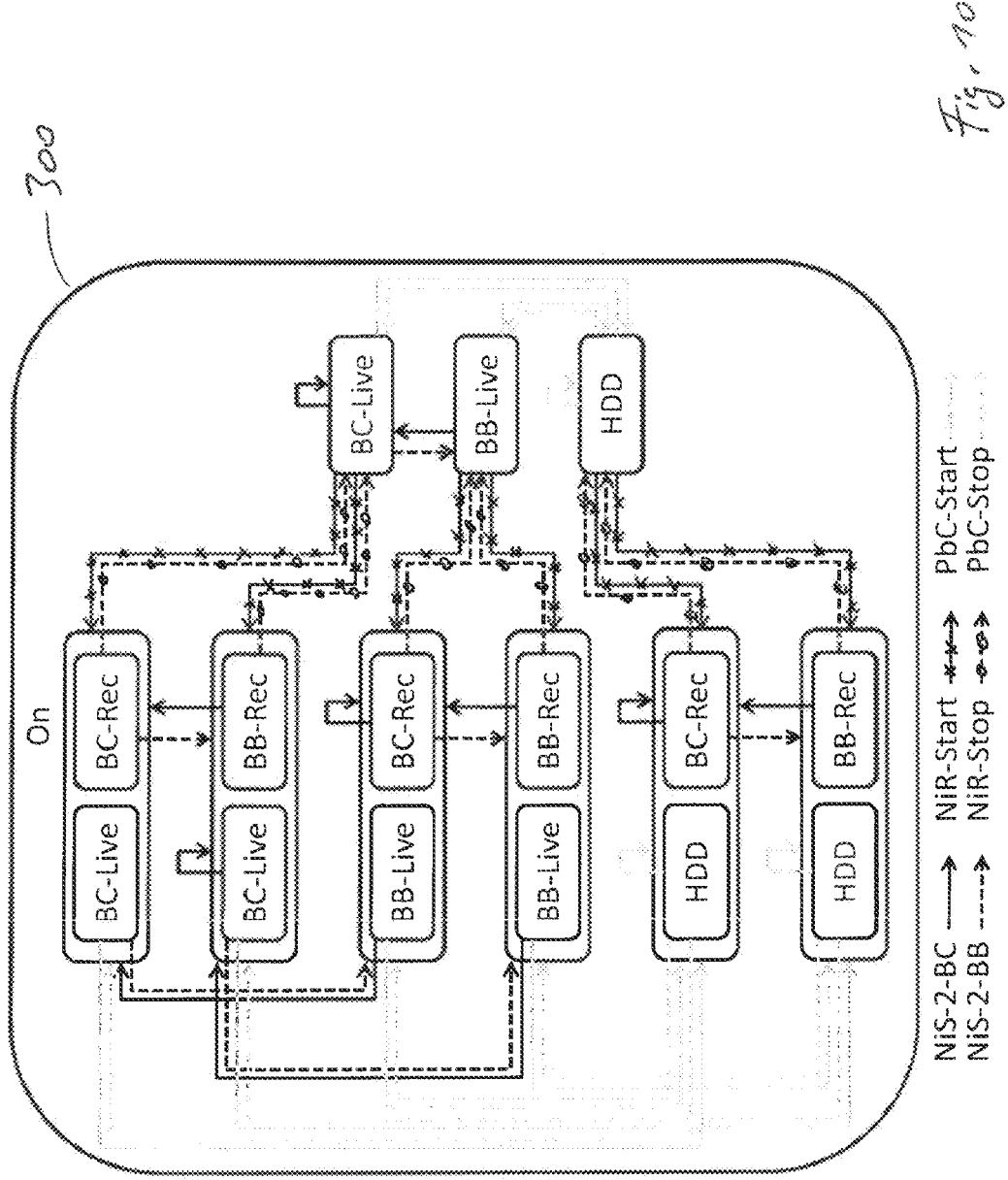
FIG. 10 shows a state diagram of an active receiver and the transitions resulting from network-initiated switching.

FIG. 10 shows a transition diagram 300 of an active receiver illustrating how the interaction of these devices is realized by illustrating the states of the active receiver and the possible transitions between these states, which could either be initiated by the network management (NiS and NiR) or be triggered by the terminal itself (PbC). User initiated actions are not considered in this diagram. Instead, the focus is on the processes running in the background while a user is watching a certain TV service, composed of live content (received via BC or BB) and pre-stored content played back from the HDD. Further, the demonstrator allows content to be recorded simultaneously and independently of the delivery network. For this purpose, it is assumed that there is sufficient capacity in the BB network for receiving two TV programs in parallel.

If so, the requirements stated above can be fulfilled, so that NiS can be performed at any time when signaled by the network management. Thus, the internal state transitions of the terminal logic can be explained as follows: The state of the FSM will be BC-Live or BB-Live if the content currently watched is not available on the local HDD and no recording is in progress. If a NiS is triggered by an incoming signaling message, a transition from BC-Live to BB-Live will be performed in case the live TV service is moved to BB (NiS-2-BB). On the other hand, the new state of the FSM would be BC-Live if the TV service is no longer delivered via the BB link but instead moved to a BC multiplex as result of a NiS- 2-BC transition. In a dynamic broadcast system, where more than one single DVB transponder is used, TV services might also be moved between different BC multiplexes. Therefore, the receiver is capable of performing NiS-2-BC also if the start state is BC-Live.

To integrate the HDD into the operation of the receiver the unique identifiers for each media content present in the broadcasting schedule are derived from the received signaling messages. Every 15 seconds it is checked, whether the media content currently watched is already stored on the HDD. If so, the playback of this content is initialized automatically (PbC-Start). During the replay (HDD), the ongoing changes in the network are recorded but NiS operations are ignored. If the end of the stored media file is eminent, the technical parameters of the current distribution channel are loaded so that the transition back to the live stream (BC-Live or BB-Live) can be performed (PbC-Stop). When the media content following subsequently is also stored on the HDD, then PbC-Start is performed instead of PbC-Stop and the state remains HDD.

If a NiR process is indicated by the network management, a parallel recording thread is created (NiR-Start) by the terminal logic and the state of the FSM is changed depending on the distribution channels of the TV service currently watched and the media content to be recorded. To give an example it shall be assumed that a NiR-Start is being processed while the FSM has been in the state BC-Live. The resulting state then could be the topmost shown in FIG. 10, BC-Live & BC-Rec, where one BC tuner is used for receiving a live TV service while the other BC tuner is used for recording. At one time the FSM can only be in one state or perform one transition between two defined states. Therefore transitions between the sub-states BC-Live, BB-Live, HDD, BC-Rec and BB-Rec can only be processed subsequently. In the above example this means, that if there are two NiS-2-BB operations affecting the TV service watched live as well as the recorded program, these have to be processed in sequence based on the arrival time of the corresponding signaling messages. If for any reason these times cannot be distinguished, the NiS-2-BB of the currently watched TV service is queued first. So the transition from BC-Live to BB-Live would then be the first step followed by the changeover from BC-Rec to BB-Rec resulting in the end state BB-Live & BB-Rec.

In the following it is discussed how the buffering of media content data is realized inside the terminal logic in order to allow for its interruption free presentation and recording in presence of NiS operations. As described above a NiS requires the simultaneous reception of identical media content via two different distribution channels in order to allow for the compensation of the delay, which might be present between both of them. In the present implementation MPEG-2 TSs are used to deliver the media content. The terminal logic therefore has been designed for the processing of multiple input streams.

Figure 11:
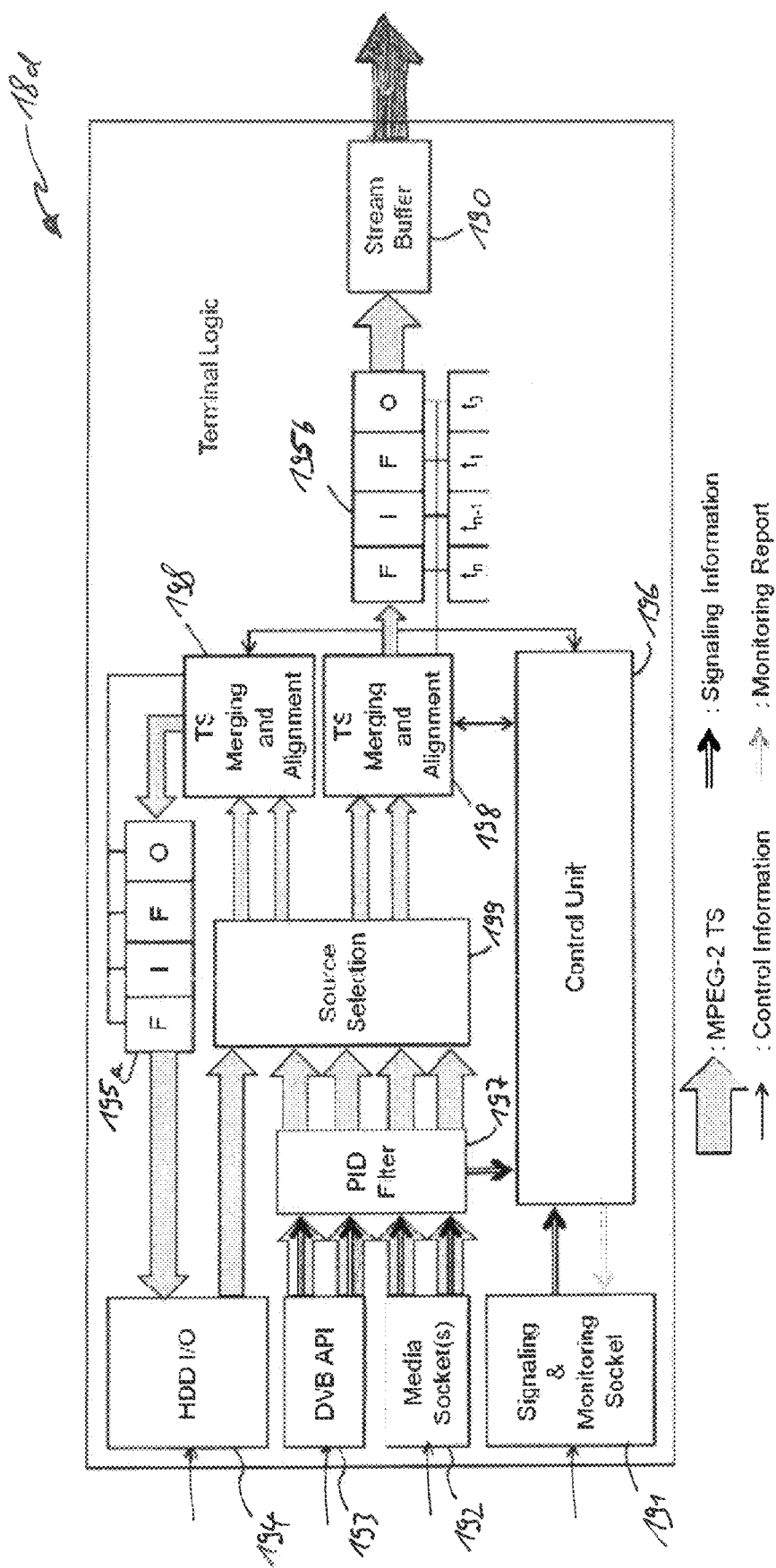
FIG. 11 shows a schematic diagram of another embodiment of a terminal.

FIG. 11 shows another embodiment of a terminal 18d including a detailed overview of the terminal logic's software components. As can be seen, the input data are provided by several interfaces. These are: the Signaling & Monitoring Socket 191 for receiving signaling messages and sending monitoring reports, the Media Socket(s) 192 for receiving the UDP stream(s), the DVB API (Application Interface) 193, which allows to control both DVB-T tuners and the HDD I/O 194, whereby media content can be read and written from/to the local hard disk.

Signaling information arriving via the IP network is directly forwarded to the Control Unit 196, whereas the signaling information embedded in the TSs first need to be extracted by a PID Filter 197. Both types of signaling messages are then interpreted by the Control Unit and translated to pre-defined events. Thereby, state transitions of the FSM are triggered.

Next, the internal buffer management in the absence of NiS is described. In case that the FSM is in one of the defined states, the media content data are simply routed towards the FIFO (First In-First Out) content buffers 195a, 195b so that the module TS Merging and Alignment 198, provided for merging and alignment of the media content data to be transmitted, is bypassed. The Source Selection module 199 thereby is responsible for routing the arriving TS packets to their desired destination so that the TS to be recorded is written to the HDD and the TS to be decoded is forwarded to the Stream Buffer 190, which provides the output interface of the terminal logic to the A/V decoder (see FIG. 9). It is necessary to store a number of TS packets for a short period of time in order to be able to compensate the delay between two distribution channels in case of NiS. For recording, a FIFO buffer of fixed size (12000 TS packets) is used. Using a fixed buffer size is possible as the media content does not need to be decoded in real-time but rather is just written to a file. In contrast, the size of the preceding FIFO buffer, which is used for caching the TS packets to be decoded, is time variant. This is necessary, as the data rate of the TS is not constant. Consequently, a constant delay through the buffer can only be achieved if the buffer fullness varies with the data rate. Therefore, the delay through the buffer is set to a fixed delay time $T_D$ and the arrival time of each TS packet at the FIFO is measured and stored in a variable $t_n$. The TS packets then are retained for the delay time $T_D$, before they are released.

Figure 12:
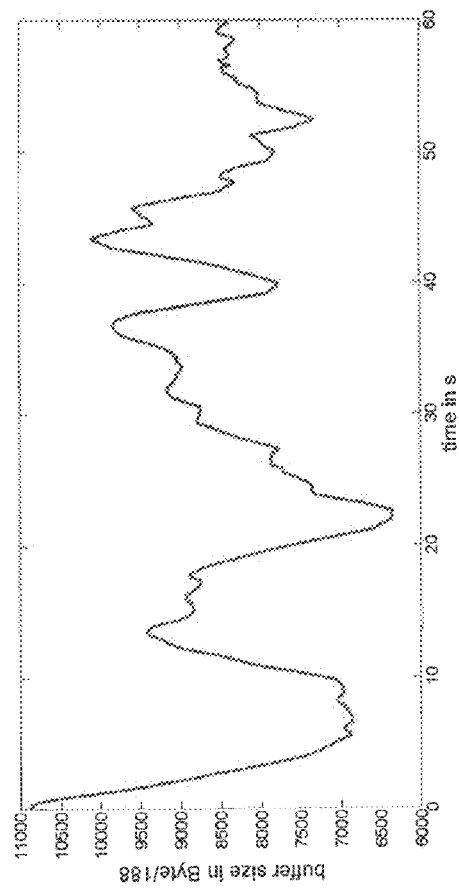
FIG. 12 shows a diagram of the data rate dependence of FIFO buffer size during 60 s of continuous TS playback without NiS for a delay time $T_D=3.5$ s.

FIG. 12 shows an exemplary result by illustrating the time variant buffer size in units of TS packets, which has been recorded during a playback time of 60 s. In this example, the delay time $T_D$ was set to 3.5 s. As can be seen from FIG. 12, the maximum number of stored TS packets was 10800 during the experiment, while the smallest buffer size was approximately 6300 TS packets. In other words, the data rate fluctuated between 2.7 Mbit/s and 4.6 Mbit/s.

Next, the internal buffer management in the presence of NiS is described. In principle, the algorithms implemented for performing NiS are the same for the continuous playback as for the continuous recording of media content. However, due to the management of the time variant buffer it is the more challenging case to perform NiS for a TV program watched live. Therefore, the transition between the FSM states BC-Live and BB-Live will be used to explain the terminal internal processing.

As the transition NiS-2-BB is triggered, the first step performed by the Terminal Logic is to switch-on the Media Socket interface. Then the TS Merging and Alignment module is activated. To start the simultaneous reception of both TSs, the Source Selection settings are changed subsequently and a timer is started for a data acquisition phase, which lasts for a duration of $T_{DAP}$. Consequently, the TS packets from both sources are routed towards the TS Merging and Alignment module. During the data acquisition phase the TS packets arriving via the new distribution channel are stored in a linear buffer $B_{new}$ inside the Merging and Alignment module, while the TS packets arriving via the current distribution channel are forwarded to the FIFO buffer. The data acquisition phase ends if the timer reaches $T_{DAP}$. Then the simultaneous reception is terminated and the sync process is started. For the synchronization the data stored in $B_{new}$ and in the FIFO buffer need to be combined to one single stream. As both TSs carry the same media content, the payload of the TS packets can be compared to find packets of identical payload in both streams. The sync point, where both streams will be aligned, will then be indicated at a random access point of the video elementary stream (a video packet where the random_access_indicator is set).

All packets of the FIFO buffer, which arrived after the sync point, will be deleted (including the sync packet itself). Instead, the corresponding packets stored in $B_{new}$ will be inserted. The program clock reference (PCR) value of the discarded sync packet is stored for later use in a variable $P_{cur}$. The PCR value of the inserted sync packet is $P_{new}$. Then, depending on the constitution of the received TSs, the deletion and/or the reordering of audio packets might be necessary. Further, the presentation time stamps (PTS) and decoding time stamps (DTS) of reordered packets might have to be modified, so that they refer to a valid PCR. At the sync point, the discontinuity flag is set, so that the discontinuity of the video elementary stream's continuity counter and PCR is indicated to the A/V decoder. Finally, the data stored inside the FIFO buffer will then represent a merged TS. This procedure turned out to ensure seamless decoding of the output stream in the demonstrative environment described above. The sync process will affect the number of stored TS packets inside the FIFO buffer. In case of a positive delay between the current and the new distribution channel the buffer size will be reduced, whereas a negative delay will increase the number of stored TS packets.

Therefore, it is mandatory to reset the delay time $T_D$. The new delay time $T_{Dnew}$ can be estimated from the TS packets stored in the FIFO buffer. To do so, the TS packets containing a PCR field need to be identified. Preferably, the program clock reference base is used, which, if present in a TS packet, is stored in a 33-bit field. The program clock reference base is in units of $f_{PCR}$=90 kHz, so that in principle, the time distance $t_{dis}$ between two TS packets k and l, which both provide a PCR field, can be approximated by the difference of the PCR values $P_l$ and $P_k$. Equation (1) is used to calculate the PCR difference $P_{diff}$ of two PCR values under the assumption that TS packet k arrived earlier than TS packet l:

$$P_{diff}(P_k, P_l) = \begin{cases} P_l - P_k & \text{for } P_l \geq P_k \\ 2^{33} - P_k + P_l & \text{for } P_l < P_k \end{cases} \quad (1)$$

The time distance $t_{dis}$ between the two TS packets k and l then can be approximated by $$t_{dis} = P_{diff}(P_k, P_l) \cdot \frac{1}{f_{PCR}}. \quad (2)$$

As result of the synchronization process, a discontinuity of the PCR values has to be expected at the sync packet. As this has to be considered during the approximation of the new delay time $T_{Dnew}$, we make the following assumptions: The first TS packet stored in the FIFO buffer that provides a PCR field is named a. The last packet stored in the FIFO buffer with a PCR field is named z. Now, $T_{Dnew}$ can be derived from the following equation:

$$T_{Dnew} = (P_{diff}(P_a, P_{cur}) + P_{diff}(P_{new}, P_z)) \cdot \frac{1}{f_{PCR}}. \quad (3)$$

The arrival times of the TS packets, stored in the FIFO buffer also have to be reconstructed after the sync process. An iterative algorithm has been implemented to perform this task. Thereby, a pair of two TS packets providing a PCR value is created in each iteration step and the number of TS packets N, which are in between, is counted. Then the time distance $t_{dis}$ between both of them is calculated. Under the assumption, that the data rate between these two adjacent PCR values is constant, the time distances to the intermediate TS packets of the fragment, can be approximated. For that, the constant time segment $\Delta t_{dis}$ is computed by (4):

$$\Delta t_{dis} = \frac{t_{dis}}{N+1} \quad (4)$$

Where no pairs can be created as the margins of the buffer are reached, the time segment $\Delta t_{dis}$ of the previous fragment is used. To start the iteration process, it is assumed that the TS packet stored last, arrived at the time when the sync processed finished. Thus, the arrival time for each precedent packet can be recalculated. When the sync point is reached, the calculated arrival time for the sync packet is reused for the next iteration step but instead of using the $P_{new}$ for further processing, the PCR of the discarded sync packet $P_{cur}$ is utilized for the next fragment in order to compensate the discontinuity of the PCR.

After recalculating an arrival time for each of the stored TS packets, the state transition process can be finalized. Therefore, the end of the processing is signaled by the TS Merging and Alignment module to the Control Unit, so that the state of the FSM can be updated to BB-Live. Subsequently, only the TS packets arriving via the Media Socket are forwarded by the Source Selection module to the FIFO buffer. The BC tuner, which is no longer needed, is switched-off by the Terminal Logic. Due to the varying processing time, needed for the synchronization, and inaccuracies in the measurement and recalculation of the arrival times of the buffered TS packets, slight time discontinuities might be present in the output stream. However, the Stream Buffer downstream the FIFO buffer allows to smooth out these time discontinuities.

Figure 13:
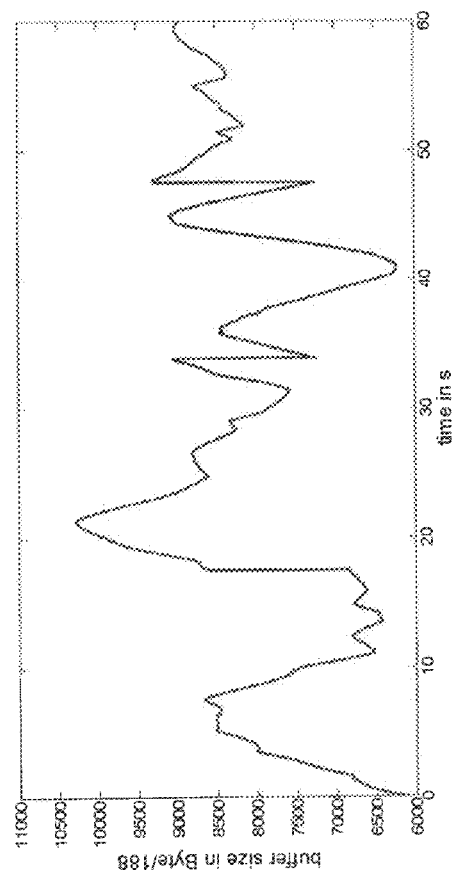
FIG. 13 shows a diagram of the rate dependence of the FIFO buffer size during 60 s of continuous TS playback including 3 NiS operations for a delay time $T_D=3.5$ s.

FIG. 13 shows the course of the buffer fullness in units of TS packets in presence of NiS. The measurement took place in an experiment, where during a playback time of 60 s, three NiS operations were indicated. At the beginning, the delay time $T_D$ was set to 3.5 s and the maximum the duration of the data acquisition phase $T_{DAP}$ was set to 2.5 s. The amount of the Stream Buffer was initially set to 1.5 s, so that a total delay through the buffers, from the DVB API to the output of the Stream Buffer, of 5 s resulted.

The start state of the FSM had been BC-Live. Then a state transition from BC-Live to BB-Live was performed followed by a NiS-2-BC transition. The end state, BB-Live, was then achieved by another NiS-2-BB transition. One can clearly identify the points in time, when the NiS operations had been completed and the transition processes were finalized by the jumps of the curve in FIG. 13. These can be found at 18 s, 34 s and 48 s respectively. Obviously, the buffer fullness increased after the first NiS, what indicates, that the broadcasted TS is delayed with respect to the UDP stream. The same can be observed from the behavior of the curve at the two following NiS operations.

FIG. 13 clearly shows, that the delay time $T_D$ must always be larger than the maximum channel delay $T_{Cmax}$, as otherwise a buffer under run may occur during a NiS. On the other hand the duration of the data acquisition phase must be long enough to compensate for the maximum channel delay ($T_{DAP} > T_{Cmax}$). Further, the maximum time distance between two random access points $\Delta t_{RAmax}$ must be considered to determine $T_{DAP}$, as only TS packets that provide a random access flag can be used as sync point. It can be assumed that the random_access_indicator is set whenever a random access point occurs in the video stream. A random access point usually occurs during less than 0.5 s, so that $\Delta t_{RAmax}$ can be set to 0.5 s. As the sync process might also require the reordering of some audio packets located before and right after the sync point, an additional reserve $t_r$ should also be considered for example by half of the time distance $\Delta t_{RAmax}$. If $\Delta t_{RAmax}$ is chosen to 0.25 s and the data rate of the encoded audio is assumed to be 192 kbit/s, then a minimum number of 32 audio packets will be available after the sync point. During an experiment, where 50 NiS operations were processed subsequently the delay was measured between the broadcasted TS and the UDP stream by comparing the arrival times of the sync packets. In these experiment the maximum channel delay $T'_{Cmax}$ turned out to be 0.832 s. Following the equation $$T_{DAPmin} = T'_{Cmax} + \Delta t_{RAmax} + t_R \quad (5)$$

the minimal duration for the data acquisition phase $T_{DAPmin}$ in the above described demonstrative environment can be approximated to be 1.582 s. As $T_D$ must always be larger than $T_{DAP}$ in order to avoid a buffer under run, it turned out to be a good choice to set $T_D$ to a value 1s larger than $T_{DAP}$. However, the minimum value of $T_D$, $T_{Dmin}$, can be derived from $T_{DAPmin}$ as it needs to be ensured, that there are always audio packets located before the sync packet inside the FIFO buffer, even in case that the maximum channel delay $T'_{Cmax}$ is present. The minimum delay through the FIFO buffer $T_{Dmin}$ therefore equals 1.832 s.

In an embodiment of the terminal said system signaling information comprises information on content provided for offline delivery, information on the time of broadcast of content via said broadcast network, information on the time of transmission of content via said broadband network, a program schedule, a delivery network indicator indicating for which period of time and/or how often stored content is to be used and/or information about parameters of multiplexing and/or coding of data representing content.

In an embodiment of the broadcast system the broadband server and/or said broadcast transmitter is configured to transmit system signaling information comprising information on content provided for offline delivery, information on the time of broadcast of content via said broadcast network, information on the allocation of content to multiplex content data streams, information on the time of transmission of content via said broadband network, a program schedule, a delivery network indicator indicating for which period of time and/or how often stored content is to be used and/or information about parameters of multiplexing and/or coding of data representing content.

In another embodiment of the terminal said signaling information processor is configured to generate a dynamic list of services and/or content available in said storage device and available for reception via said broadcast network and/or said broadband network from said system signaling information.

In another embodiment of the terminal said signaling information processor is configured to process content identifiers assigned to content or content components for generating said dynamic list.

In another embodiment of the terminal said broadcast receiver and/or said broadband receiver are configured to retrieve system signaling information in a pull mode and/or to receive signaling information in a push mode.

In another embodiment of the terminal it further comprises a user interface that receives a user's requests.

In another embodiment of the terminal said storage device is configured to buffer the content received during a predetermined overlap time from both receivers and that said management unit is configured to synchronize the two received content data streams of said content and to switch from one content data stream to the other content data stream after said synchronization.

In another embodiment of the terminal a delay through said storage device is set to a predetermined delay time and said storage device is configured to measure and store the arrival time of received content data packets.

In another embodiment of the terminal said management unit comprises a finite state machine.

In another embodiment of the terminal said management unit is configured to process requests for network initiated switching, network initiated recording, user initiated switching and/or user initiated recording.

In another embodiment of the terminal it further comprises a presentation unit coupled to said output unit that presents content output by said output unit to a user.

Dynamic broadcast introduces a new way to use the scarce terrestrial spectrum more efficiently. This is achieved by the co-working of broadcast and broadband networks, and particularly the user terminals. Being capable to access to both networks and equipped with a storage device user terminals become an active and important component of the system.

The benefits of dynamic broadcast can be enormous: For the broadcaster and the operator of broadcast networks the network cost can be reduced and/or more capacity on the same network ("virtual channels", i.e. channels which are traditionally used for broadcasting predetermined content according to a predetermined schedule, but which are now free for use by other services or transmission of other content since said predetermined content is broadcast earlier for storage in the terminal or is transmitted via a broadband network) can be generated without increase in spectrum and cost. The usage of the created "White Spaces" will be organized in a broadcaster-controlled fashion. Moreover this is an elegant way to avoid the proliferation of inflexible "Digital Dividends". For the operator of broadband networks, it may be possible to reduce the peak traffic in times where popular programs are broadcasted. For the operators of cellular networks and Wi-Fi, and other wireless communication networks, additional spectrum resources will be made available. And conflicts with broadcasters and the public as a result of unmanaged/uncontrolled interference can also be avoided. For the regulator, this is a way to prevent conflicts between operators of cellular networks and broadcasters, and to ease the problems occurring as a result of the use of "White Spaces". It can be seen as a smooth path towards a next "Digital Dividend".

In contrast to today's TV sets, user terminals become active network components, which are capable of accessing both networks, and which are equipped with a storage device in order to support the various delivery mechanisms of a dynamic broadcast system. Based on monitoring and signaling data linear TV services need to be built up directly inside the terminals. Network initiated switching operations and also recording and playback functionalities, which are required to fulfill this task, have been introduced.

A terminal generally allows receiving the same TV service via broadcast (DVB-T) and broadband (UDP/IP) in parallel. Based on the assumption that equivalent A/V can be received via either way and that these data are delivered as payload of MPEG-2 TS packets the sync process required for seamless switching between the transmission channels had been developed.

In the end it is worth pointing out that dynamic broadcast is not restricted to terrestrial broadcast networks but can also be deployed in cable or, generally, any other broadcast networks. Further, the broadband network can generally be any (wired or wireless) broadband network, such as an interne, IP, computer or communications network. The terminal may be stationary or portable (e.g. part of a mobile phone, PDA or tablet PC) device and may generally use any data transmission protocol. Further, the terminal may be incorporated into a home gateway, such as a broadband router, and may include broadcast receivers for a whole domicile or building. Still further, the terminal may be included into a Femtocell. Still further, the terminal, the elements of the broadcast system and the control device are not limited to the embodiments shown and explained herein. For instance, the terminal may comprise two or more broadcast receivers (of the same type or of different type, e.g. to receive broadcast content from different broadcast networks) and/or two or more broadband receivers (of the same type or of different type, e.g. to receive broadband content from different broadband networks).

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A terminal for use in a dynamic broadcast system comprising:
 a broadcast receiver configured to receive content broadcast via a broadcast network;
 a broadband receiver configured to receive content obtained via a broadband network;
 a broadband transmitter configured to transmit information via said broadband network;
 a storage device that stores received content, at least a subset of the received content being stored under a network initiative;
 an output circuit that outputs received or stored content; and
 a management circuit that controls said broadcast receiver, said broadband receiver and said storage device to control which content to receive and/or to store and to switch, based on content popularity, between said broadcast receiver, said broadband receiver and said storage device to control which content to provide to the output circuit.

2. The terminal as claimed in claim 1, wherein said broadband transmitter is configured to transmit terminal signaling information including a request to transmit predetermined content to said terminal.

3. The terminal as claimed in claim 1, further comprising:
 a monitoring circuit that monitors user specific content usage and that generates monitoring data carrying information on user specific content usage.

4. The terminal as claimed in claim 1, further comprising:
 a measurement circuit that measures the quality of a transmission link between said broadband receiver and said broadband network and/or the quality of a reception of content broadcast via said broadcast network.

5. The terminal as claimed in claim 1, further comprising:
 an output controller that controls said output circuit to control the output of content.

6. The terminal as claimed in claim 5, wherein said output controller is configured to prevent output of pre-stored content to the user before a predetermined presentation time set by a content provider of said content.

7. The terminal as claimed in claim 1, further comprising:
 a signaling information processor that processes system signaling information received by said broadcast receiver and/or said broadband receiver.

8. The terminal as claimed in claim 1, wherein said management circuit is configured to control said broadcast receiver, said broadband receiver and said storage device to switch between said broadcast receiver, said broadband receiver and said storage device to provide a seamless output of selected content.

9. The terminal as claimed in claim 1, wherein said management circuit is configured to control said broadcast receiver and said broadband receiver to switch between said broadcast receiver and said broadband receiver for reception of selected content for providing a seamless output of the selected content to the user, wherein said switching is controlled a predetermined overlap time for receiving content from both said broadcast receiver and said broadband receiver.

10. A receiving method for use in a dynamic broadcast system comprising:
 receiving content broadcast via a broadcast network;
 receiving content obtained via a broadband network;
 storing received content in a terminal, at least a subset of the received content being stored under a network initiative;
 transmitting, from the terminal including a broadband transmitter, information via said broadband network;
 outputting received or stored content; and
 controlling said receiving and said storing to control which content to receive and/or to store and to switch, based on content popularity, between said receiving via said broadcast network, said receiving via said broadband network and said storing to control which content to output.

11. A non-transitory computer readable medium having instructions stored thereon which, when carried out on a computer, causes the computer to perform the steps of the method as claimed in claim 10.

* * * * *